(12) United States Patent
Bell et al.

(10) Patent No.: US 10,564,731 B2
(45) Date of Patent: Feb. 18, 2020

(54) PROCESSING OF GESTURE-BASED USER INTERACTIONS USING VOLUMETRIC ZONES

(71) Applicant: Facebook, Inc., Menlo Park, CA (US)

(72) Inventors: Matthew Bell, Palo Alto, CA (US); Tipatat Chennavasin, Menlo Park, CA (US); Charles H. Clanton, Burlingame, CA (US); Michael Hulme, Morgan Hill, CA (US); Eyal Ophir, Stanford, CA (US); Matthew Vieta, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 77 days.

(21) Appl. No.: 15/803,517

(22) Filed: Nov. 3, 2017

(65) Prior Publication Data

US 2018/0157334 A1  Jun. 7, 2018

Related U.S. Application Data

(60) Continuation of application No. 14/739,922, filed on Jun. 15, 2015, now Pat. No. 9,811,166, which is a
(Continued)

(51) Int. Cl.
*G06F 3/01* (2006.01)
*G06F 3/0481* (2013.01)
(Continued)

(52) U.S. Cl.
CPC .............. *G06F 3/017* (2013.01); *G01B 11/14* (2013.01); *G06F 3/011* (2013.01); *G06F 3/0304* (2013.01);
(Continued)

(58) Field of Classification Search
CPC ........ G06F 3/011; G06F 3/017; G06F 3/0304; G06F 3/04812; G06F 3/04883; G06K 9/00335; G01B 11/14; A63F 2300/1087
See application file for complete search history.

(56) References Cited

U.S. PATENT DOCUMENTS 2,917,980 A  12/1959 Grube et al.
3,068,754 A  12/1962 Benjamin et al.
(Continued)

FOREIGN PATENT DOCUMENTS

CN  1289086 A  3/2001
EP  0 055 366 A2  7/1982
(Continued)

OTHER PUBLICATIONS

EffecTV Version 0.2.0 released Mar. 27, 2001, available online at http://web.archive.org/web/20010101-20010625re_http://effectv_sourceforge.net.
(Continued)

*Primary Examiner* — Eric J. Bycer
(74) *Attorney, Agent, or Firm* — FisherBroyles, LLP

(57) ABSTRACT

Systems and methods for processing gesture-based user interactions within an interactive display area are provided. The display of one or more virtual objects and user interactions with the one or more virtual objects may be further provided. Multiple interactive areas may be created by partitioning an area proximate a display into multiple volumetric spaces or zones. The zones may be associated with respective user interaction capabilities. A representation of a user on the display may change as the ability of the user to interact with one or more virtual object changes.

20 Claims, 7 Drawing Sheets

Related U.S. Application Data continuation of application No. 13/556,090, filed on Jul. 23, 2012, now Pat. No. 9,058,058, which is a division of application No. 12/210,994, filed on Sep. 15, 2008, now Pat. No. 8,230,367.

(60) Provisional application No. 60/993,907, filed on Sep. 14, 2007.

(51) Int. Cl.
    *G06F 3/0488*     (2013.01)
    *G01B 11/14*     (2006.01)
    *G06F 3/03*     (2006.01)
    *G06K 9/00*     (2006.01)

(52) U.S. Cl.
    CPC ...... *G06F 3/04812* (2013.01); *G06F 3/04883* (2013.01); *G06K 9/00335* (2013.01); *A63F 2300/1087* (2013.01)

(56) References Cited

U.S. PATENT DOCUMENTS

| | | |
|---|---|---|
| 3,763,468 A | 10/1973 | Ovshinsky et al. |
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,769,697 A | 9/1988 | Gilley et al. |
| 4,791,572 A | 12/1988 | Green et al. |
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |
| 5,418,583 A | 5/1995 | Masumoto |
| 5,423,554 A | 6/1995 | Davis |
| 5,426,474 A | 6/1995 | Rubstov et al. |
| 5,436,639 A | 7/1995 | Arai et al. |
| 5,442,252 A | 8/1995 | Golz |
| 5,454,043 A | 9/1995 | Freeman |
| 5,473,396 A | 12/1995 | Okajima et al. |
| 5,497,269 A | 3/1996 | Gal |
| 5,510,828 A | 4/1996 | Lutterbach et al. |
| 5,526,182 A | 6/1996 | Jewell et al. |
| 5,528,263 A | 6/1996 | Platzker et al. |
| 5,528,297 A | 6/1996 | Seegert et al. |
| 5,534,917 A | 7/1996 | MacDougall |
| 5,548,694 A | 8/1996 | Gibson |
| 5,591,972 A | 1/1997 | Noble et al. |
| 5,594,469 A | 1/1997 | Freeman et al. |
| 5,633,691 A | 5/1997 | Vogeley et al. |
| 5,662,401 A | 9/1997 | Shimizu et al. |
| 5,703,637 A | 12/1997 | Miyazaki et al. |
| 5,771,307 A | 6/1998 | Lu et al. |
| 5,808,784 A | 9/1998 | Ando et al. |
| 5,846,086 A | 12/1998 | Bizzi et al. |
| 5,861,881 A | 1/1999 | Freeman et al. |
| 5,882,204 A | 3/1999 | Iannazo et al. |
| 5,900,982 A | 5/1999 | Dolgoff et al. |
| 5,923,380 A | 7/1999 | Yang et al. |
| 5,923,475 A | 7/1999 | Kurtz et al. |
| 5,953,152 A | 9/1999 | Hewlett |
| 5,966,696 A | 10/1999 | Giraud |
| 5,969,754 A | 10/1999 | Zeman |
| 5,978,136 A | 11/1999 | Ogawa et al. |
| 5,982,352 A | 11/1999 | Pryor |
| 6,008,800 A | 12/1999 | Pryor |
| 6,058,397 A | 5/2000 | Barrus et al. |
| 6,072,494 A | 6/2000 | Nguyen |
| 6,075,895 A | 6/2000 | Qiao et al. |
| 6,084,979 A | 7/2000 | Kanada et al. |
| 6,088,612 A | 7/2000 | Blair |
| 6,097,369 A | 8/2000 | Wambach |
| 6,097,390 A | 8/2000 | Marks |
| 6,106,119 A | 8/2000 | Edwards |
| 6,118,888 A | 9/2000 | Chino et al. |
| 6,125,198 A | 9/2000 | Onda |
| 6,128,003 A | 10/2000 | Smith et al. |
| 6,166,744 A | 12/2000 | Jaszlics et al. |
| 6,176,782 B1 | 1/2001 | Lyons et al. |
| 6,191,773 B1 | 2/2001 | Maruno et al. |
| 6,195,104 B1 | 2/2001 | Lyons |
| 6,198,487 B1 | 3/2001 | Fortenbery et al. |
| 6,198,844 B1 | 3/2001 | Nomura |
| 6,215,890 B1 | 4/2001 | Matsuo et al. |
| 6,217,449 B1 | 4/2001 | Kaku |
| 6,222,465 B1 | 4/2001 | Kumar et al. |
| 6,254,246 B1 | 7/2001 | Tiao et al. |
| 6,263,339 B1 | 7/2001 | Hirsh |
| 6,270,403 B1 | 8/2001 | Watanabe et al. |
| 6,278,418 B1 | 8/2001 | Doi |
| 6,292,171 B1 | 9/2001 | Fu et al. |
| 6,304,267 B1 | 10/2001 | Sata |
| 6,308,565 B1 | 10/2001 | French et al. |
| 6,323,895 B1 | 11/2001 | Sata |
| 6,333,735 B1 | 12/2001 | Anvekar |
| 6,335,977 B1 | 1/2002 | Kage |
| 6,337,699 B1 | 1/2002 | Nielsen |
| 6,339,748 B1 | 1/2002 | Hiramatsu |
| 6,346,933 B1 | 2/2002 | Lin |
| 6,349,301 B1 | 2/2002 | Mitchell et al. |
| 6,351,222 B1 | 2/2002 | Swan et al. |
| 6,353,428 B1 | 3/2002 | Maggioni et al. |
| 6,359,612 B1 | 3/2002 | Peter et al. |
| 6,377,298 B1 | 4/2002 | Scheele et al. |
| 6,388,657 B1 | 5/2002 | Natoli |
| 6,394,896 B2 | 5/2002 | Sugimoto |
| 6,400,374 B2 | 6/2002 | Lanier |
| 6,407,870 B1 | 6/2002 | Hurevich et al. |
| 6,414,672 B2 | 7/2002 | Rekimoto et al. |
| 6,445,815 B1 | 9/2002 | Sato |
| 6,454,419 B2 | 9/2002 | Kitazawa |
| 6,464,375 B1 | 10/2002 | Wada et al. |
| 6,476,834 B1 | 11/2002 | Doval et al. |
| 6,477,239 B1 | 11/2002 | Ohki et al. |
| 6,480,267 B2 | 11/2002 | Yanagi et al. |
| 6,491,396 B2 | 12/2002 | Karasawa et al. |
| 6,501,515 B1 | 12/2002 | Iwamura |
| 6,513,953 B1 | 2/2003 | Itoh |
| 6,522,312 B2 | 2/2003 | Ohshima et al. |
| 6,545,706 B1 | 4/2003 | Edwards et al. |
| 6,552,760 B1 | 4/2003 | Gotoh et al. |
| 6,598,978 B2 | 7/2003 | Hasegawa |
| 6,607,275 B1 | 8/2003 | Cimini et al. |
| 6,611,241 B1 | 8/2003 | Firester et al. |
| 6,654,734 B1 | 11/2003 | Mani et al. |
| 6,658,150 B2 | 12/2003 | Tsuji et al. |
| 6,661,918 B1 | 12/2003 | Gordon et al. |
| 6,677,969 B1 | 1/2004 | Hongo |
| 6,707,054 B2 | 3/2004 | Ray |
| 6,707,444 B1 | 3/2004 | Hendriks et al. |
| 6,712,476 B1 | 3/2004 | Ito et al. |
| 6,720,949 B1 | 4/2004 | Pryor et al. |
| 6,732,929 B2 | 5/2004 | Good et al. |
| 6,747,666 B2 | 6/2004 | Utterback |
| 6,752,720 B1 | 6/2004 | Clapper et al. |
| 6,754,370 B1 | 6/2004 | Hall-Holt et al. |
| 6,791,700 B2 | 9/2004 | Omura et al. |
| 6,792,398 B1 | 9/2004 | Handley et al. |
| 6,808,293 B2 | 10/2004 | Watanabe et al. |
| 6,826,727 B1 | 11/2004 | Mohr et al. |
| 6,831,664 B2 | 12/2004 | Marmaropoulos et al. |
| 6,871,982 B2 | 3/2005 | Holman et al. |
| 6,873,710 B1 | 3/2005 | Cohen-Solal et al. |
| 6,877,882 B1 | 4/2005 | Haven et al. |
| 6,882,480 B2 | 4/2005 | Yanagisawa |
| 6,902,310 B2 | 6/2005 | Im |

(56) References Cited

U.S. PATENT DOCUMENTS

| | | |
|---|---|---|
| 6,912,313 B2 | 6/2005 | Li |
| 6,965,693 B1 | 11/2005 | Kondo et al. |
| 6,975,360 B2 | 12/2005 | Slatter |
| 6,996,460 B1 | 2/2006 | Krahnstoever et al. |
| 6,999,600 B2 | 2/2006 | Venetianer |
| 7,000,200 B1 | 2/2006 | Martins |
| 7,001,023 B2 | 2/2006 | Lee et al. |
| 7,006,236 B2 | 2/2006 | Tomasi et al. |
| 7,015,894 B2 | 3/2006 | Morohoshi |
| 7,042,440 B2 | 5/2006 | Pryor et al. |
| 7,050,177 B2 | 5/2006 | Tomasi et al. |
| 7,054,068 B2 | 5/2006 | Yoshida et al. |
| 7,058,204 B2 | 6/2006 | Hildreth et al. |
| 7,068,274 B2 | 6/2006 | Welch et al. |
| 7,069,516 B2 | 6/2006 | Rekimoto |
| 7,084,859 B1 | 8/2006 | Pryor et al. |
| 7,088,508 B2 | 8/2006 | Ebina et al. |
| 7,095,401 B2 | 8/2006 | Liu et al. |
| 7,129,927 B2 | 10/2006 | Mattsson |
| 7,149,262 B1 | 12/2006 | Nayar et al. |
| 7,158,676 B1 | 1/2007 | Rainsford |
| 7,170,492 B2 | 1/2007 | Bell |
| 7,190,832 B2 | 3/2007 | Frost et al. |
| 7,193,608 B2 | 3/2007 | Stuerzlinger |
| 7,227,526 B2 | 6/2007 | Hildreth et al. |
| 7,259,747 B2 | 8/2007 | Bell |
| 7,262,874 B2 | 8/2007 | Suzuki |
| 7,268,950 B2 | 9/2007 | Poulsen |
| 7,274,800 B2 | 9/2007 | Nefian et al. |
| 7,289,130 B1 | 10/2007 | Satoh et al. |
| 7,317,836 B2 | 1/2008 | Fujimura et al. |
| 7,330,584 B2 | 2/2008 | Weiguo et al. |
| 7,331,856 B1 | 2/2008 | Nakamura et al. |
| 7,339,521 B2 | 3/2008 | Scheidemann et al. |
| 7,340,077 B2 | 3/2008 | Gokturk et al. |
| 7,348,963 B2 | 3/2008 | Bell |
| 7,367,887 B2 | 5/2008 | Watabe et al. |
| 7,379,563 B2 | 5/2008 | Shamaie |
| 7,382,897 B2 | 6/2008 | Brown et al. |
| 7,394,459 B2 | 7/2008 | Bathiche et al. |
| 7,428,542 B1 | 9/2008 | Fink et al. |
| 7,431,253 B2 | 10/2008 | Yeh |
| 7,432,917 B2 | 10/2008 | Wilson et al. |
| 7,468,742 B2 | 12/2008 | Ahn et al. |
| 7,480,870 B2 | 1/2009 | Anzures et al. |
| 7,536,032 B2 | 5/2009 | Bell |
| 7,559,841 B2 | 7/2009 | Hashimoto |
| 7,576,727 B2 | 8/2009 | Bell |
| 7,593,552 B2 | 9/2009 | Higaki et al. |
| 7,598,942 B2 | 10/2009 | Underkoffler et al. |
| 7,619,824 B2 | 11/2009 | Poulsen |
| 7,665,041 B2 | 2/2010 | Wilson et al. |
| 7,671,321 B2 | 3/2010 | Perlman et al. |
| 7,710,391 B2 | 5/2010 | Bell et al. |
| 7,724,280 B2 | 5/2010 | Gin et al. |
| 7,728,280 B2 | 6/2010 | Feilkas et al. |
| 7,737,636 B2 | 6/2010 | Li et al. |
| 7,738,725 B2 | 6/2010 | Raskar et al. |
| 7,745,771 B2 | 6/2010 | Troxell et al. |
| 7,769,205 B2 | 8/2010 | Arias-Estrada et al. |
| RE41,685 E | 9/2010 | Feldman et al. |
| 7,809,167 B2 | 10/2010 | Bell |
| 7,834,846 B1 | 11/2010 | Bell |
| 7,873,906 B2 | 1/2011 | Womack |
| 7,907,117 B2 | 3/2011 | Wilson et al. |
| 7,961,906 B2 | 6/2011 | Ruedin |
| 7,971,156 B2 | 6/2011 | Albertson et al. |
| 8,018,579 B1 | 9/2011 | Krah |
| 8,035,612 B2 | 10/2011 | Bell et al. |
| 8,035,624 B2 | 10/2011 | Bell et al. |
| 8,064,704 B2 | 11/2011 | Kim et al. |
| 8,072,470 B2 | 12/2011 | Marks |
| 8,081,822 B1 | 12/2011 | Bell |
| 8,085,293 B2 | 12/2011 | Brodsky et al. |
| 8,085,994 B2 | 12/2011 | Kim |
| 8,098,277 B1 | 1/2012 | Bell |
| 8,121,352 B2 | 2/2012 | Arias-Estrada et al. |
| 8,159,682 B2 | 4/2012 | Bell |
| 8,199,108 B2 | 6/2012 | Bell et al. |
| 8,230,367 B2 | 7/2012 | Bell et al. |
| 8,259,163 B2 | 9/2012 | Bell et al. |
| 8,384,753 B1 | 2/2013 | Bedingfield, Sr. |
| 8,487,866 B2 | 7/2013 | Bell et al. |
| 8,611,667 B2 | 12/2013 | Wilson et al. |
| 8,745,541 B2 | 6/2014 | Wilson et al. |
| 2001/0012001 A1 | 8/2001 | Rekimoto et al. |
| 2001/0033675 A1 | 10/2001 | Maurer et al. |
| 2002/0006583 A1 | 1/2002 | Michiels et al. |
| 2002/0032697 A1 | 3/2002 | French et al. |
| 2002/0032906 A1 | 3/2002 | Grossman |
| 2002/0041327 A1 | 4/2002 | Hildreth et al. |
| 2002/0046100 A1 | 4/2002 | Kinjo |
| 2002/0064382 A1 | 5/2002 | Hildreth et al. |
| 2002/0073417 A1 | 6/2002 | Kondo et al. |
| 2002/0078441 A1 | 6/2002 | Drake et al. |
| 2002/0081032 A1 | 6/2002 | Chen et al. |
| 2002/0103617 A1 | 8/2002 | Uchiyama et al. |
| 2002/0105623 A1 | 8/2002 | Pinhanez |
| 2002/0130839 A1 | 9/2002 | Wallace et al. |
| 2002/0140633 A1 | 10/2002 | Rafii et al. |
| 2002/0140682 A1 | 10/2002 | Brown et al. |
| 2002/0178440 A1 | 11/2002 | Agnihorti et al. |
| 2002/0186200 A1 | 12/2002 | Green |
| 2003/0032484 A1 | 2/2003 | Ohshima et al. |
| 2003/0065563 A1 | 4/2003 | Elliott et al. |
| 2003/0078840 A1 | 4/2003 | Strunk et al. |
| 2003/0091724 A1 | 5/2003 | Mizoguchi |
| 2003/0093784 A1 | 5/2003 | Dimitrova et al. |
| 2003/0098819 A1 | 5/2003 | Sukthankar et al. |
| 2003/0103030 A1 | 6/2003 | Wu |
| 2003/0113018 A1 | 6/2003 | Nefian et al. |
| 2003/0122839 A1 | 7/2003 | Matraszek et al. |
| 2003/0126013 A1 | 7/2003 | Shand |
| 2003/0137494 A1 | 7/2003 | Tulbert |
| 2003/0156756 A1 | 8/2003 | Gokturk et al. |
| 2003/0161502 A1 | 8/2003 | Morihara et al. |
| 2003/0178549 A1 | 9/2003 | Ray |
| 2003/0218760 A1 | 11/2003 | Tomasi et al. |
| 2004/0005924 A1 | 1/2004 | Watabe et al. |
| 2004/0015783 A1 | 1/2004 | Lennon et al. |
| 2004/0046744 A1 | 3/2004 | Rafii et al. |
| 2004/0073541 A1 | 4/2004 | Lindblad et al. |
| 2004/0091110 A1 | 5/2004 | Barkans |
| 2004/0155962 A1 | 8/2004 | Marks |
| 2004/0165006 A1 | 8/2004 | Kirby et al. |
| 2004/0193413 A1 | 9/2004 | Wilson et al. |
| 2004/0212725 A1 | 10/2004 | Raskar et al. |
| 2005/0028188 A1 | 2/2005 | Latona et al. |
| 2005/0039206 A1 | 2/2005 | Opdycke |
| 2005/0086695 A1 | 4/2005 | Keele et al. |
| 2005/0088407 A1 | 4/2005 | Bell |
| 2005/0091614 A1 | 4/2005 | Wasko et al. |
| 2005/0185828 A1 | 4/2005 | Semba et al. |
| 2005/0104506 A1 | 5/2005 | Youh et al. |
| 2005/0122308 A1 | 6/2005 | Bell et al. |
| 2005/0132266 A1 | 6/2005 | Ambrosino et al. |
| 2005/0147135 A1 | 7/2005 | Kurtz et al. |
| 2005/0147282 A1 | 7/2005 | Fujii |
| 2005/0195598 A1 | 9/2005 | Dancs et al. |
| 2005/0231532 A1* | 10/2005 | Suzuki .............. G06F 3/012 345/633 |
| 2005/0265587 A1 | 12/2005 | Schneider |
| 2006/0001760 A1 | 1/2006 | Matsumura et al. |
| 2006/0010400 A1 | 1/2006 | Dehlin et al. |
| 2006/0013440 A1 | 1/2006 | Cohen et al. |
| 2006/0031786 A1 | 2/2006 | Hillis et al. |
| 2006/0078015 A1 | 4/2006 | Franck |
| 2006/0111182 A1 | 5/2006 | Nakanishi et al. |
| 2006/0132432 A1 | 6/2006 | Bell |
| 2006/0132725 A1 | 6/2006 | Terada et al. |
| 2006/0168515 A1 | 7/2006 | Dorsett, Jr. et al. |
| 2006/0184993 A1 | 8/2006 | Goldthwaite et al. |
| 2006/0187196 A1 | 8/2006 | Underkoffler et al. |
| 2006/0187545 A1 | 8/2006 | Doi |

(56) References Cited

U.S. PATENT DOCUMENTS

| | | |
|---|---|---|
| 2006/0227099 A1 | 10/2006 | Han et al. |
| 2006/0242145 A1 | 10/2006 | Krishnamurthy et al. |
| 2006/0256382 A1 | 11/2006 | Matraszek et al. |
| 2006/0258397 A1 | 11/2006 | Kaplan et al. |
| 2006/0294247 A1 | 12/2006 | Hinckley et al. |
| 2006/0294258 A1 | 12/2006 | Powers-Boyle et al. |
| 2007/0002039 A1 | 1/2007 | Pendleton et al. |
| 2007/0019066 A1 | 1/2007 | Cutler |
| 2007/0199035 A1 | 8/2007 | Schwartz et al. |
| 2007/0209009 A1 | 9/2007 | Huang |
| 2007/0259716 A1 | 11/2007 | Mattice et al. |
| 2007/0285419 A1 | 12/2007 | Givon |
| 2008/0013826 A1 | 1/2008 | Hillis et al. |
| 2008/0018595 A1 | 1/2008 | Hildreth et al. |
| 2008/0030460 A1 | 2/2008 | Hildreth et al. |
| 2008/0036732 A1 | 2/2008 | Wilson et al. |
| 2008/0040692 A1 | 2/2008 | Sunday et al. |
| 2008/0062123 A1 | 3/2008 | Bell |
| 2008/0062257 A1 | 3/2008 | Corson |
| 2008/0089587 A1 | 4/2008 | Kim et al. |
| 2008/0090484 A1 | 4/2008 | Lee et al. |
| 2008/0123109 A1 | 5/2008 | Iwasaki |
| 2008/0150890 A1 | 6/2008 | Bell et al. |
| 2008/0170123 A1 | 7/2008 | Albertson et al. |
| 2008/0179507 A2 | 7/2008 | Han |
| 2008/0212306 A1 | 9/2008 | Huang et al. |
| 2008/0252596 A1 | 10/2008 | Bell et al. |
| 2008/0267447 A1 | 10/2008 | Kelusky et al. |
| 2008/0284925 A1 | 11/2008 | Han |
| 2008/0320394 A1 | 12/2008 | Womack |
| 2009/0027337 A1 | 1/2009 | Hildreth |
| 2009/0031240 A1 | 1/2009 | Hildreth |
| 2009/0079813 A1 | 3/2009 | Hildreth |
| 2009/0102788 A1 | 4/2009 | Nishida et al. |
| 2009/0106785 A1 | 4/2009 | Pharn |
| 2009/0172606 A1 | 7/2009 | Dunn et al. |
| 2009/0179733 A1 | 7/2009 | Hattori et al. |
| 2009/0228841 A1 | 9/2009 | Hildreth |
| 2009/0235295 A1 | 9/2009 | Bell et al. |
| 2009/0256801 A1 | 10/2009 | Helmer |
| 2010/0026624 A1 | 2/2010 | Bell et al. |
| 2010/0039500 A1 | 2/2010 | Bell et al. |
| 2010/0060722 A1 | 3/2010 | Bell et al. |
| 2010/0121866 A1 | 5/2010 | Bell et al. |
| 2011/0041100 A1 | 2/2011 | Boillot |
| 2011/0157316 A1 | 6/2011 | Okamoto et al. |
| 2012/0080411 A1 | 4/2012 | Mizuyama et al. |
| 2012/0200843 A1 | 8/2012 | Bell et al. |
| 2012/0293625 A1 | 11/2012 | Schneider et al. |
| 2012/0317511 A1 | 12/2012 | Bell et al. |

FOREIGN PATENT DOCUMENTS

| | | |
|---|---|---|
| EP | 0 626 636 A2 | 11/1994 |
| EP | 0 913 790 A1 | 5/1999 |
| EP | 1 689 172 A1 | 6/2002 |
| EP | 1 087 327 A2 | 3/2011 |
| JP | 57-094672 | 6/1982 |
| JP | 10-207619 | 8/1998 |
| JP | 11-057216 | 3/1999 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| JP | 2004-246578 | 9/2004 |
| JP | 2007-514242 | 5/2007 |
| KR | 2003-0058894 | 7/2003 |
| WO | WO 98/38533 A1 | 9/1998 |
| WO | WO 00/16562 A1 | 3/2000 |
| WO | WO 01/63916 A1 | 8/2001 |
| WO | WO 02/01537 A2 | 1/2002 |
| WO | WO 02/100094 A2 | 12/2002 |
| WO | WO 2004/055776 A1 | 7/2004 |
| WO | WO 2004/097741 A1 | 11/2004 |
| WO | WO 2005/003948 A1 | 1/2005 |
| WO | WO 2005/041578 A2 | 5/2005 |
| WO | WO 2005/041579 A2 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Index of EffecTV, as downloaded on Apr. 30, 2007 at http://effectv.cvs.sourceforge.net/effectv/EffecTV/?pathrev=rel_0_2_0.

R111, The Transformation From Digital Information to Analog Matter, available online at http://www.particles.de/paradocs/r111/10mkp2004/hmtl/r111_text111hock04.html, cited on Jan. 17, 2005 during opposition of European Application No. 02739710.8, filed Jun. 4, 2002.

2001 Symposium on Interactive 3D Graphics program description, ACM SIGGRAPH, held Mar. 19-21, 2001, Research Triangle Park, NC, downloaded from http://www.allconferences.com/conferences/2000830092631/, cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at http://www.research.microsoft.com/PUIWorkshop/, cited during opposition of European Application No. 02739710.8, filed Jun. 4, 2002.

Bodymover Body Movement as a Means to Obtain an Audiovisual Spatial Experience, 2000 ART+COM AG Berlin; http://www.artcom.de/index,php?option=com_acprojects&page=6&id=28&Itemid=144&tdetails=0&lang=en, as downloaded on Aug. 8, 2005.

ART=COM Bodymover 2000, as downloaded on Aug. 21, 2009 from http://www.artcom.de/index.php?option=com_acprojects&page=6&id=28&Itemid=144&details=0&lang=en, cited during opposition of European Application No. 02739710.8, filed Jun. 4, 2002.

Brown, Matthew, et al. "Multi-Image Matching using Multi-Scale Oriented Patches," Technical Report, Dec. 2004, pp. 1-48, available online at ftp://ftp.research.microsoft.com/pub/tr/TR-2004-133.pdf.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, http://billbuxton.com/multitouchOverview.html.

Crouser, P.D., et al., "Unattenuated tracer particle extraction through time-averaged, background image subtraction with outlier rejection," Experiments in Fluids, 22, 1997, 220-228, Springer-Verlag.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at http://www.mine-control.com, downloaded on Mar. 15, 2007.

DePiero et al; "3-D Computer Vision Using Structured Light: Design, Calibrations and Implementation Issues"; Advances in Computers, vol. 43, pp. 243-278, 1996.

EffecTV Software Source: effect module, dated May 20, 2001 (German); cited during opposition of European Application No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

(56) References Cited

OTHER PUBLICATIONS

Foerterer, Holger, "Fluidum," 1999, art installation, description available online at http://www.foerterer.com/fluidum, downloaded on Mar. 16, 2007.
Foerterer, Holger, "Helikopter," 2001, art installation, description available online at http://www.foerterer.com/helikopter/index.htm, downloaded on Mar. 16, 2007.
Freeman, William, et al., "Computer vision for interactive computer graphics," May-Jun. 1998, IEEE Computer Graphics and Applications, vol. 18, No. 3, pp. 42-53.
Frisken, Sarah F. et al., "Adaptively Sampled Distance Fields: A General Representation of Shape for Computer Graphics," Jul. 23-28, 2000, Proceedings Of the 27th Annual Conference on Computer Graphics and Interactive Techniques, pp. 249-254.
Fujihata, Masaki, "Beyond Pages," 1995, art installation, description available online at http://on1.zkm.de/zkm/werke/BeyondPages, downloaded on Mar. 16, 2007.
Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.
GroundFX Document, GestureTek (Very Vivid, Inc.), description available online at http://www.gesturetek.com/groundfx, downloaded on Aug. 11, 2006.
Haller, Michael et al., "Coeno-Storyboard: An Augmented Surface for Storyboard Presentations," Mensch & Computer 2005, Sep. 4-7, 2005, Linz, Austria.
Han, Jefferson Y., "Low-Cost Multi-Touch Sensing Through Frustrated Total Internal Reflection," Oct. 23-26, 2005, ACM Symposium on User Interface Software and Technology (UIST).
Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.
Hemmer, Raphael Lozano, "Body Movies," 2002, art project/installation, description available online at http://www.lozano-hemmer.com/eproyecto.html, downloaded on Mar. 16, 2007.
Hoff, Kenneth E. III et al, "Fast and Simple 2D Geometric Proximity Queries Using Graphics Hardware," Mar. 19-21, 2001, Proc. Of the 2001 Symposium on Interactive 3D Graphics, pp. 145-148.
Huang, Mark et al. "Shadow Vision," Introduction to Computer Graphics, Fall 1999, Dec. 6, 1999; pp. 1-10, XP55013291 http://groups.csail.mit.edu/graphics/classes/6.837/F99/projects/reports/team16.pdf.
Ivars Peterson, "Artificial reality; combining a person's live video image with computer graphics suggests novel ways of working and playing with computers" Science News, Jun. 22, 1985.
Jabri, Sumer et al., "Detection and Location of People in Video Images Using Adaptive Fusion of Color and Edge Information;" presented at the Int. Conf. Pattern Recognition, Barcelona, Spain, 2000.
Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.
Katz, Itai et al., "A Multi-Touch Surface Using Multiple Cameras," Oct. 3, 2007, Advanced Concepts for Intelligent Vision Systems, vol. 4678/2007.
Keays, Bill, "metaField Maze," 1998, exhibited at Siggraph'99 Emerging Technologies and Ars Electronica Aug. 8-13, 1999, description available online at http://www.billkeays.com/metaFieldInfosheet1A.pdf.
Keays, Bill, "Using High-Bandwidth Input/Output in Interactive Art," Jun. 1999, Master's Thesis, Massachusetts Institute of Technology, School of Architecture and Planning.
Khan, Jeff; "Intelligent Room with a View"; Apr.-May 2004, RealTime Arts Magazine, Issue 60, available online at www.realtimearts.net/article/60/7432.

Kjeldesn, Rick et al., "Dynamically Reconfigurable Vision-Based User Interfaces," Apr. 2003, 3rd International Conference on Vision Systems (ICVVS '03), Graz, Austria, pp. 6-12.
Kjeldsen, R. et al., "Interacting with Steerable Projected Displays," May 20-21, 2002, Proceedings Of the 5th International Conference on Automatic Face and Gesture Recognition, Washington, D.C.
Kreuger, Myron, "Videoplace—An Artificial Reality," Apr. 1985, Conference on Human Factors in Computing Systems, San Francisco, California, pp. 35-40.
Kreuger, Myron, "Videoplace," 1969 and subsequent, summary available online at http://www.itnimoy.com/itp/newmediahistory/videoplace, downloaded Mar. 21, 2007.
Kurapati, Kaushal, et al., "A Multi-Agent TV Recommender," Jul. 13-14, 2001, Workshop on Personalization in Future TV, pp. 1-8, XP02228335.
Lamarre, Mathieu, et al., "Background subtraction using competing models in the block-DCT domain," Pattern Recognition, 2002 Proceedings, 16 International Conference in Quebec City, Que., Canada, Aug. 11-15, 2002.
Langer, Maria, "Mac OS X 10.2: Visual QuickStart Guide," Sep. 17, 2002, Peachpit Press, p. 111.
Lantagne, Michel, et al., "VIP: Vision tool for comparing Images of People," Vision Interface, Jun. 11-13, 2003, pp. 1-8.
Leibe, Bastian, et al., "The Perspective Workbench; Toward Spontaneous and Natural Interaction in Semi-Immersive Virtual Environments," Mar. 18-22, 2000, IEEE Computer Society, Los Alamitos, CA; pp. 13-20.
Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Levin, Golan "Computer Vision for Artists and Designers: Pedagogic Tools and Techniques for Novice Programmers," Aug. 2006, AI & Society, vol. 20, Issue 4, pp. 462-482.
Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-1.
Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application N.
Malik, Shahzad et al., "Visual Touchpad: A Two-Handed Gestural Input Device," Oct. 13-15, 2004, International Conference on Multimodal Interfaces (ICMI '04).
MacIver, Malcolm, et al., "Body Electric," Apr. 15-Jun. 29, 2003, art installation, description available online at http://www.neuromech.northwestern.edu/uropataglum/#ArtSci.
Mandala Systems, "Video Gesture Control System Concept," 1986, description available online at <http://www.vividgroup.com/tech.html>, downloaded on Mar. 16, 2007.
Microsoft Surface multi-touch interface table unveiled, May 30, 2007, downloaded from http://www.dancewithshadows.com/tech/microsoft-surface.asp.
Microsoft Surface Web Page, downloaded from http://www.microsoft.com/surface/Pages/Product/WhatIs.aspx on Sep. 24, 2009.
Experience Microsoft Surface, downloaded from http://www.microsoft.com/surface/Pages/Product/Specifications.aspx on Sep. 24, 2009.
Microsoft Surface, downloaded from http://en.wikipedia.org/wiki/Microsoft_surface on Sep. 24, 2009.
Mitsubishi DiamondTouch, http://www.merl.com/projects/DiamondTouch/ visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).
Morano, Raymond A. et al., "Structured Light Using Pseudorandom Codes," Mar. 1998, IEEE Transactions on Pattern Analysis and Machine Intelligence, vol. 20, No. 3.

(56) References Cited

OTHER PUBLICATIONS

Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
Muench, Wolfgang, "Bubbles", Prix Ars Electonica Catalog 1999, Springer-Verlag, Berlin, Germany; available online at http://hosting.zkm.de/wmuench.bub/text, downloaded on Mar. 16, 2007.
Paradiso, Joseph et al., "Optical Tracking for Music and Dance Performance," Conference on Optical 3-D Measurement Techniques, XX, XX, No. 4th, Sep. 30, 1997, pp. 1-8, XP002548974. http://www.media.mit.edu/resenv/pubs/papers/97_09_Zurich_3D4.pdf.
Paradiso, Joseph et al., "New Sensor and Music Systems for Large Interactive Surfaces," Aug. 2000, Proceedings of the Interactive Computer Music Conference, Berlin, Germany, pp. 277-280.
Penny, Simon, "Fugitive"; Oct. 1997; http://www.ace.uci.edu/penny/works/fugitive/fugitive.html.
Penny, Simon, et al., "Fugitive II, " Jan. 8-Mar. 14, 2004, Australian Center for the Moving Image, art installation, description available online at http://www.acmi.net.au/fugitive.jsp?.
Penny, Simon, et al.; TRACES: WIRELESS full body tracking in the CAVE, Dec. 16-18, 1999; Japan; ICAT Virtual Reality Conference; http://turing.ace.uci.edu/pennytexts.traces/.
Pinhanez, C. et al., "Ubiquitous Interactive Graphics," Jul. 29-31 2003, IBM Research Report RC22495, available at http://www.research.ibm.com/ed/publications/rc22495.pdf.
Pinhanez, C., "The Everywhere Displays Projector: A Device to Create Ubiquitous Graphical Interfaces," Ubicomp 2001: Ubiquitous Computing: International Conference Atlanta, Georgia, USA, Sep. 30-Oct. 2, 2001 Proceedings (Lecture Notes in Compute.
PLASMA; 3 pages; http://www.particles.de/paradocs/plasma/index.html cited in U.S. Appl. No. 10/160,217, filed Aug. 8, 2005.
Quinz, Emanuele; "Conference Papers", Apr. 10, 2001, XP55013293, Retrieved from the internet http://www.isea2000.com/pop_actes.htm.
Quinz, Emanuele; "Digital Performance", pp. 1-3, Retrieved from the internet on Nov. 28, 2011 http://www.noemaiab.org/sections/ideas/ideas_articles/pdf/.
Reatrix, Inc. website, Mar. 28, 2003, http://web.archive org/web/20030328234205/http://www.reatrix.com and http://web.archive.org/web/20030328234205/http://www.reatrix.com/webdemo.php.
Rekimoto, J., et al., "Perceptual Surfaces: Towards a Human and Object Sensitive Interactive Display," Oct. 19-21, 1997, Proceedings Of the Workshop on Perceptual User Interfaces, Banff, Canada, pp. 30-32.
Rekimoto, Jun, "SmartSkin: An Infrastructure for Freehand Manipulation on Interactive Surfaces." vol. No. 4, Issue No. 1, pp. 113-120, Apr. 2002.
Ringel, M. et al., "Barehands: Implement-Free Interaction with a Wall-Mounted Display," Mar. 31-Apr. 5, 2001, Proceedings Of the 2001 ACM CHI Conference on Human Factors in Computing Systems (Extended Abstracts), p. 367-368.
Rogala, Miroslav, "Lovers Leap," Nov. 21-26, 1995, art installation, Dutch Electronic Arts Festival, description available online at http://wayback.v2.nl/DEAF/persona/rogaia.html.
Rokeby, David, "Very Nervous System (VNS)," Mar. 1995, Wired Magazine, available online at <http://www.wired.com/wired/archive/3.03/rokeby.html>; sold as software at http://homepage.mac.com/davidrokeby/softVNS.html.
Rokeby, David, "softVNS 2 real time video processing and tracking software for Max;" SoftVNS 2 downloads, as downloaded from http://homepage.mac.com/davidrokeby/softVNS.html on Mar. 16, 2007.
Sato, Yoichi, et al., "Fast Tracking of Hands and Fingertips in Infrared Images for Augmented Desk Interface," Mar. 2000, 4th International Conference on Automatic Face-and Gesture-Recognition, Grenoble, France.
Schneider, John K., "Improved Fingerprint System Using Rolled and Multi-segmented Techniques," Provisional U.S. Appl. No. 60/575,952, filed Jun. 1, 2004, pp. 1-6.
Screenshots of Reactrix Product Demo Video, Mar. 28, 2003, http://web.archive.org/web/20030407174258/http://www.reactrix.com/demo/reactrix_demo.wmv.
Sester, Marie, "Access," Dec. 2001, Interaction 99 Biennial Catalog, Gifu, Japan, available online at http://www.accessproject.net/concept.html.
Snibbe, Scott, "Boundary Functions," Sep. 7-12, 1998, art installation, description available online at http://snibbe.com/scott/bf/index.html.
Snibbe, Scott, "Screen Series," 2002-2003 art installation, description available online at http://snibbe.com/scott/screen/index.html, downloaded on Mar. 16, 2007.
Sonneck, Georg, et al., "Optimized One-to-One Personalization of Web Applications using a Graph Based Model," IEEE-22, Apr. 26, 2003, 9 pgs.
Sparacino, Flavia, et al., "Dance Space: An Interactive Video Interface", Actes/Proceeding, ISEA2000-Oct. 12, 2000-Auditorium 1, Dec. 10, 2000.
Sparacino, Flavia, et al., "Media in performance: interactive spaces for dance, theater, circus and museum exhibits," Nov. 2000, IBM Systems Journal, vol. 39, No. 3-4, pp. 479-510.
Sparacino, Flavia, "(Some) Computer Visions Based Interfaces for Interactive Art and Entertainment Installations," 2001, INTER_FACE Body Boundaries, Anomalie digital_arts, No. 2, Paris, France, http://alumni.media.mit.edu/~flavia/publications.html.
Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.
Supreme Particles, "PLASMA/Architexture," 1994, available online at http://www.particles.de/paradocs/plasma/plasma_e.html, downloaded on May 21, 2007.
Supreme Particles; R111, 1999, available online at http://www.r111.org, obtained Jul. 12, 2005, XP-002989704.
Tan, P, et al., "Highlight Removal by Illumination-Constrained Inpainting," Ninth IEEE International Conference on Computer Vision, Oct. 13-16, 2003.
The History of Microsoft Surface, downloaded from http://www.microsoft.com/presspass/presskits/surfacecomputing/docs/SurfaceHistoryBG.doc on Sep. 24, 2009.
Torr, P.H.S. et al., "The Development and Comparison of Robust Methods for Estimating the Fundamental Matrix," Sep./Oct. 1997, International Journal of Computer Vision, vol. 24, No. 3, pp. 271-300.
Toth, Daniel et al., "Illumination-Invariant Change Detection," Apr. 2-4, 2000, 4th IEEE Southwest Symposium on Image Analysis and Interpretation, p. 3.
Trefzger, Petra, "Vorwerk," 2000, art installation, description available online at http://www.petracolor.de/ cited on Jan. 17, 2005 during opposition of European Application No. 02739710.8, filed Jun. 4, 2002.
Utterback, Camille, et al., "Text Rain,"1999, art installation, available online at www.camilleutterback.com/textrain.html, Mar. 16, 2007.
Vogt, Florian et al., "Highlight Substitution in Light Fields," IEEE International Conference on Image Processing, Sep. 22-25, 2002.
Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.
Wellner, Pierre, "Interacting with paper on the DigitalDesk," Jul. 1993, Communications of the ACM, Special issue on computer augmented environments: back to the real world, vol. 36, Issue 7, pp. 87-96.
Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.
Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.
Xiao, Yang; "Throughput and Delay Limits of IEEE 802.11," IEEE Communications Letters, vol. 6, No. 8, pp. 355-357, Aug. 2002.

(56) References Cited

OTHER PUBLICATIONS

Official Communication in Chinese Patent Application No. 2004-80030951.8, dated Mar. 27, 2009.
International Preliminary Report on Patentability for PCT/US2004/035477, filed Oct. 25, 2004.
International Search Report for PCT/US2004/035477, filed Oct. 25, 2004.
Written Opinion of the International Searching Authority for PCT/US2004/035477, filed Oct. 25, 2004.
International Preliminary Report on Patentability for PCT/US2004/041318, filed Dec. 9, 2004.
International Search Report for PCT/US2004/041318, filed Dec. 9, 2004.
Written Opinion of the International Searching Authority for PCT/US2004/041318, filed Dec. 9, 2004.
International Preliminary Report on Patentability for PCT/US2006/030720, filed on Aug. 4, 2006.
International Search Report for PCT/US2006/030720, filed Aug. 4, 2006.
Written Opinion of the International Searching Authority for PCT/US2006/030720, filed Aug. 4, 2006.
International Preliminary Report on Patentability for PCT/US2005/008984, filed Mar. 18, 2005.
International Search Report for PCT/US2005/008984, filed Mar. 18, 2005.
Written Opinion of the International Searching Authority for PCT/US2005/008984, filed Mar. 18, 2005.
Official Communication in Chinese Application No. 200480034551.4, dated Feb. 19, 2008.
Official Communication in Korean Patent Application No. 2006-7011270, dated Mar. 8, 2011.
International Preliminary Report on Patentability for PCT/US2004/041320, filed Dec. 9, 2004.
International Search Report for PCT/US2004/041320, filed Dec. 9, 2004.
Written Opinion of the International Searching Authority for PCT/US2004/041320, filed Dec. 9, 2004.
International Preliminary Report on Patentability for PCT/US2004/041319, filed Dec. 9, 2004.
International Search Report for PCT/US2004/041319, filed Dec. 9, 2004.
Written Opinion of the International Searching Authority for PCT/US2004/041319, filed Dec. 9, 2004.
Official Communication in Australian Application No. 2002312346, dated Nov. 14, 2006.
Official Communication in Chinese Application No. 02815206.9, dated Dec. 12, 2008.
Article 96(2) Communication dated in European Application No. 02739710.8, Mar. 31, 2004.
Observation by third party Michael Saup cited during opposition of European Application No. 02739710.8 filed Jun. 4, 2002, dated Jan. 17, 2005.
Observation by third party Petra Trefzger cited during opposition of European Application No. 02739710.8 filed Jun. 4, 2002, dated Jan. 17, 2005.
Observation by third party Simon Penny cited during opposition of European Application No. 02739710.8 filed Jun. 4, 2002, dated Jan. 17, 2005.
Article 96(2) Communication in European Application No. 02739710.8, dated Feb. 25, 2005.
Summons to Attend Oral Proceedings in European Application No. 02739710.8, dated Aug. 12, 2005.
Notice of Opposition in European Application No. 02739710.8 dated May 14, 2007.
Affidavit of Daniel Barthels regarding EffecTV, dated May 15, 2007 (partial machine translation), cited during opposition of European Application No. 02739710.8, filed Jun. 4, 2002.
Letter dated from Christian Zuckschwerdt regarding EffecTV, (partial machine translation), cited during opposition of European Application No. 02739710.8, filed Jun. 4, 2002, May 16, 2007.
Communication dated Dec. 10, 2008 from Patentanwalt attaching article by Katy Bachman, entitled "Reactrix Up for Sale," cited during opposition of European Application No. 02739710.8, filed Jun. 4, 2002.
Summons to Attend Oral Proceedings in European Application No. 02739710.8, dated Jun. 12, 2009.
Decision revoking the European Patent in European Application No. 02739710.8, dated Dec. 28, 2009.
Provision of the minutes in European Application No. 02739710.8, dated Dec. 28, 2009.
Letter of the opponent O2 in European Application No. 02739710.8, filed Jun. 4, 2002, dated May 28, 2010.
Notice of Opposition in European Application No. 02739710.8, dated Aug. 23, 2010.
International Preliminary Examination Report for PCT/US2002/017843, filed Jun. 4, 2002.
Written Opinion for PCT/US2002/017843, filed Jun. 4, 2002.
International Search Report for PCT/US2002/017843, filed Jun. 4, 2002, dated Feb. 5, 2003.
Extended Search Report for European Application No. 06010825.5, filed Jun. 4, 2002, dated Jul. 6, 2006.
International Preliminary Report on Patentability for PCT/US2004/035478, filed Oct. 25, 2004.
International Search Report for PCT/US2004/035478, filed Oct. 25, 2004.
Written Opinion of the International Searching Authority for PCT/US2004/035478, filed Oct. 25, 2004.
Invitation to Pay Additional Fees and Partial international Search Report on Patentability for PCT/US2004/035478, filed Oct. 25, 2004.
International Search Report for PCT/US2008/059900, filed Apr. 10, 2008.
Written Opinion of the International Searching Authority for PCT/US2008/059900, filed Apr. 10, 2008.
Official Report in Australian Application No. 2008299883, dated Dec. 8, 2010.
Official Communication in Canadian Patent Application No. 2,699,628, dated May 15, 2012.
Extended Search Report for European Application No. 08830473.8, dated Apr. 19, 2011.
Official Communication in Japanese Application No. 2010-524887, dated Apr. 10, 2012.
International Preliminary Report on Patentability for PCT/US2008/10750, filed Sep. 15, 2008.
International Search Report for PCT/US2008/10750, filed Sep. 15, 2008.
International Search Report for PCT/US03/40321, filed Dec. 15, 2003.
Office Action in U.S. Appl. No. 12/210,994 dated Dec. 22, 2010.
Final Office Action in U.S. Appl. No. 12/210,994 dated Apr. 14, 2011.
Office Action in U.S. Appl. No. 12/210,994 dated Aug. 3, 2011.
Examiner Interview Summary in U.S. Appl. No. 12/210,994 dated Sep. 1, 2011.
Final Office Action in U.S. Appl. No. 12/210,994 dated Dec. 23, 2011.
Notice of Allowance in U.S. Appl. No. 12/210,994 dated Mar. 19, 2012.
Official Report in Australian Application No. 2008299883, dated Sep. 5, 2011.
Official Communication in Japanese Application No. 2010-524887, dated Feb. 15, 2013.
Office Action in Canadian Patent Application No. 2,699,628, dated Jan. 21, 2014.
Chinese Office Action dated Jun. 11, 2015 for Chinese Patent Application No. CN200880115391.4.

\* cited by examiner

PROCESSING OF GESTURE-BASED USER INTERACTIONS USING VOLUMETRIC ZONES

CROSS-REFERENCE TO RELATED APPLICATIONS

The present application is a continuation of U.S. patent application Ser. No. 14/739,922, filed on Jun. 15, 2015, now U.S. Pat. No. 9,811,116, entitled "PROCESSING OF GESTURE-BASED USER INTERACTIONS USING VOLUMETRIC ZONES, " which is a continuation of U.S. patent application Ser. No. 13/556,090, filed on Jul. 23, 2012, now U.S. Pat. No. 9,058,058, entitled "PROCESSING OF GESTURE-BASED USER INTERACTIONS USING ACTIVATION LEVELS," which is a divisional of U.S. patent application Ser. No. 12/210,994, filed on Sep. 15, 2008, now U.S. Pat. No. 8,230,367, entitled "PROCESSING OF GESTURE-BASED USER INTERACTIONS USING VOLUMETRIC ZONES," which claims the benefit of priority under 35 U.S.C. .sctn. 119(e) of U.S. Provisional Patent Application No. 60/993,907, filed Sep. 14, 2007, entitled "USER INTERFACE IN A THREE DIMENSIONAL ENVIRONMENT," the entirety of each of which is incorporated herein by reference. Any and all priority claims identified in the Application Data Sheet, or any correction thereto, are hereby incorporated by reference under 37 C.F.R. .sctn. 1.57.

BACKGROUND OF THE INVENTION

Field of the Invention

The present invention generally relates to interactive display systems. More specifically, the present invention concerns user interfaces for processing gesture-based user interactions with an interactive display in a three-dimensional environment.

Description of the Related Art

Many existing interactive technologies rely on the likes of two-dimensional cameras. The two-dimensional data generated by these cameras is difficult to reliably parse for the purpose of separating a foreground from a background. As a result, it is difficult to isolate the hands or other appendages of a user and track corresponding movements of the same.

Poor isolation and tracking data leads to difficulties with respect to providing data to an interactive display system. If an interactive display system is unable to gather data for controlling or manipulating information rendered through the same, a user may be forced to rely upon button presses or manipulation of physical objects, such as keyboards, joysticks, and actuators. Once a user is forced to rely upon physical instruments for providing input, many of the benefits offered by an interactive display system are lost.

There is a need for processing of gesture-based user interactions with respect to interactive display systems.

SUMMARY OF THE INVENTION

In a first embodiment, a method for processing gesture-based user interactions with an interactive display is disclosed. Through the method, three-dimensional information about an object in a defined three-dimensional space in gathered. A portion of the three-dimensional information as corresponding to a hand of a user in the defined three-dimensional space is identified. An on-screen image of a digital object is displayed as is an on-screen image associated with and approximating the physical shape of the user. The displayed on-screen image approximates that of the user and does not interact with the displayed digital object. An icon corresponding to the hand of the user in the defined three-dimensional space is displayed. The icon is capable of interacting with the displayed digital object.

A second method for processing gesture-based user interactions with an interactive display is disclosed in a further embodiment. In this further embodiment, three-dimensional information about users in a defined three-dimensional space is gathered. The defined three-dimensional space includes volumetric zones. A portion of each of the users as defined by the three-dimensional information is located in one or more of the volumetric zones. A portion of the three-dimensional information corresponds to a hand of one of the users in the defined three-dimensional space. On screen digital objects are displayed as is an indication of whether one of the users is currently capable of interacting with the displayed digital. This indication corresponds to the location of the user in one or more of the volumetric zones.

A third embodiment is for yet another method for processing gesture-based user interactions with an interactive display. Three-dimensional information about an object in a defined three-dimensional space is gathered and a portion of the three-dimensional information is identified as corresponding to a hand of a user in the defined three-dimensional space. An on-screen image of a digital object is displayed and that has a visually perceptible activation state that corresponds to whether the user has exceeded an activation level threshold for the digital object. An icon is displayed for interacting with the on-screen image of the digital object, the icon corresponding to the hand of the user in the defined three-dimensional space. The activation level corresponds to a position of the hand of the user over time.

In a still further embodiment, a further method for processing gesture-based user interactions with an interactive display is disclosed. Three-dimensional information about an object in a defined three-dimensional space is gathered and a portion of the three-dimensional information is identified as corresponding to a hand of a user in the defined three-dimensional space. An on-screen image of a digital object is displayed, which has an activation level threshold. An icon is displayed for interacting with the onscreen image of the digital object, the icon corresponding to the hand of the user in the defined three-dimensional space. The icon may control an action associated with the digital object only if the activation level threshold of the displayed digital object has been surpassed. The activation level threshold of the digital object is surpassed as a result of the icon being proximate to a region associated with the digital object over time.

DETAILED DESCRIPTION OF THE PREFERRED EMBODIMENT

Figure 1:
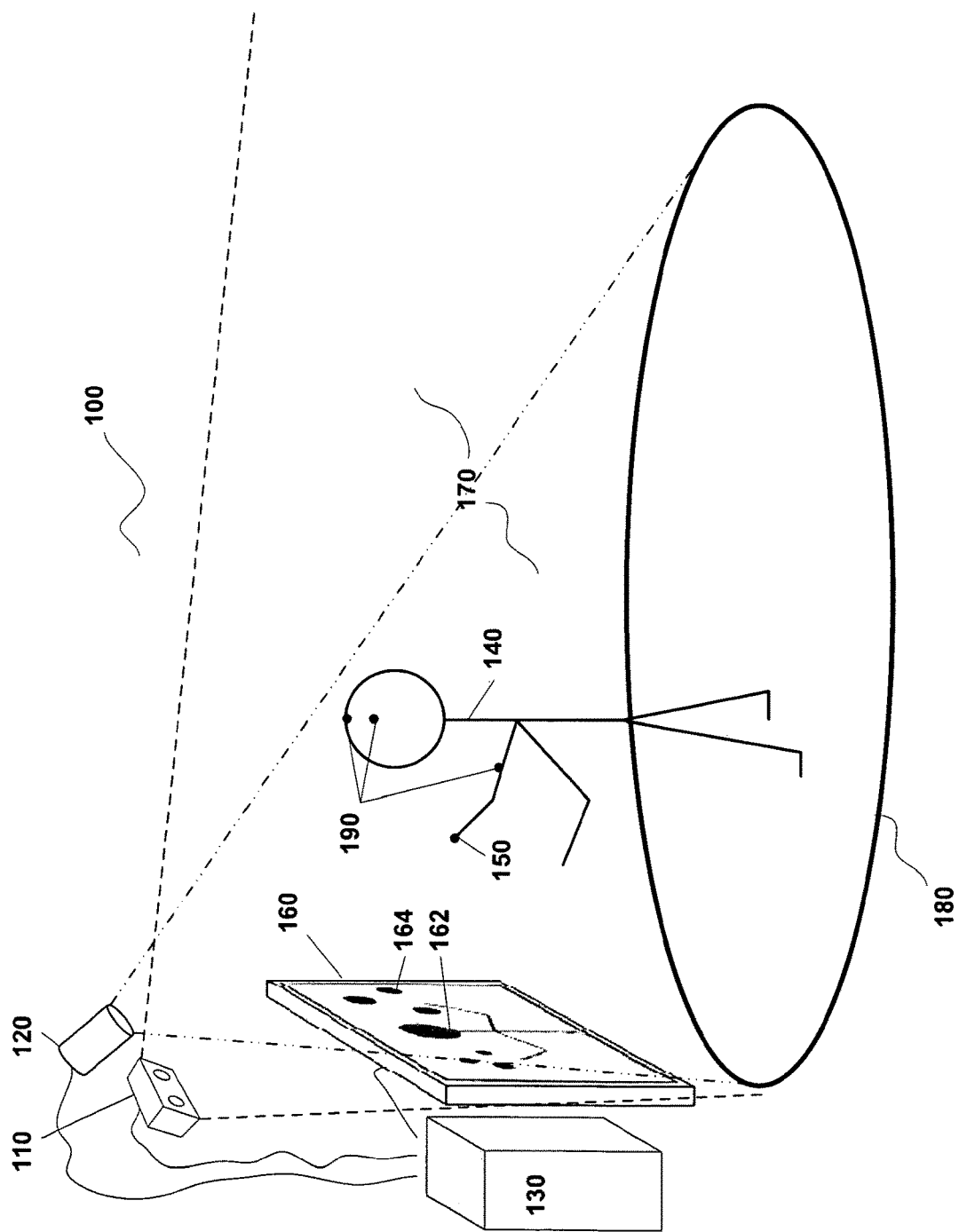
FIG. 1 illustrates an exemplary flat panel interface system.

FIG. 1 illustrates an exemplary flat panel interface system 100. The system 100 includes a display 160, a three-dimensional vision system 110, a computing system 130, and an optional illuminator 120. The system 100 may be configured according to any variety of form factors.

Display 160 may assume any variety of configurations including displays capable of showing video images. In one embodiment, the display 160 is a flat panel display, such as a liquid crystal display (LCD), a plasma screen, or an organic light emitting diode display (OLED) screen. The display may alternatively include, without limitation, a cathode ray tube (CRT), an electronic ink screen, a rear projection display, a front projection display, an off-axis front (or rear) projector such as the WT600 projector sold by NEC, a screen that produces a three-dimensional image such as a lenticular three-dimensional video screen, or a fog screen such as the Heliodisplay™ screen from IO2 Technology USA. Multiple screens may be tiled to form a single, larger display. The system 100 may contain more than one interactive display 160 whereby more than one user may concurrently interact with the system 100.

In one configuration (like that of FIG. 1), various elements of the system 100 may be mounted to a wall. Elements of the system 100 may alternatively be mounted to the ceiling, freestanding, mounted on a table, or in a two-sided configuration. Freestanding systems may contain a large base or may be bolted in to the ground for stability.

Embodiments of the system 100 that incorporate three-dimensional objects may utilize three-dimensional hardware and software systems whereby the display 160, for example, may be cylindrical or spherical. These and other form factor configurations such as those involving the floor, a tabletop, or wall projection system may likewise utilize three-dimensional vision systems. In such embodiments, the three-dimensional vision system 110 may cover areas around the display. Projectors may be used to generate the displays, such as a floor projection, in which a projector mounted on the ceiling casts an image on the ground, allowing the user 140 to walk on the screen area.

The projection may also be cast on a table, a wall or any other surface. Multiple projectors and multiple three-dimensional vision systems may be used to create extended areas of interactivity on a floor, a wall, or another surface.

Embodiments of system 100 may vary in size. For example, three-dimensional vision system 110 may be attached to the top of a laptop computer monitor thereby allowing the system 100 to be portable. The laptop itself may operate as computing system 130 and handle the three-dimensional vision software and generation of visual effects.

System 100 may, as noted above, include an illuminator 120. The position of the three-dimensional vision system 110 and illuminator 120 in FIG. 1 is illustrative. The three-dimensional vision system 110 and illuminator 120 may be arranged in a variety of locations relative to the display 160 and/or one another. Further, there may be multiple instances of three-dimensional vision system 110 and illuminator 110. The three-dimensional vision system 110 and/or illuminator 120 may use one or mirrors or other reflective surfaces (not shown) to change the position of interactive area 170.

The system 100 may use a microphone or microphone array to capture audio input and may use speakers to create audio output. The microphone(s) may be directional so as to better capture audio from specific users without background noise. The speaker(s) may also be directional so as to focus audio onto specific users and specific areas. Examples of directed speakers include the Maestro™ and the Solo-Sphere™ from Brown Innovations in addition to those systems manufactured by Dakota Audio, Holosonics, and The American Technology Corporation of San Diego (ATCSD).

Three-dimensional vision system 110 may be implemented using stereo vision. Stereo vision systems use information from two or more cameras to construct a three-dimensional image. Three-dimensional computer vision techniques using algorithms such as those based on the Marr-Poggio algorithm may take as input two or more images of the same scene taken from slightly different angles.

Marr-Poggio-based algorithms are merely one example of stereo algorithms in that they find texture patches from the different cameras' images that correspond to the same part of the same physical object. The disparity between the positions of the patches in the images allows the distance from the camera to that patch to be determined, thus providing three-dimensional position data for that patch.

The performance of this algorithm tends to degrade, however, when dealing with objects of uniform color because uniform color makes it difficult to match corresponding patches in different images. Thus, if an illuminator 120 creates light that is textured, the texturing of an otherwise uniform color can improve the distance estimates of some three-dimensional computer vision algorithms.

Exemplary stereo cameras that may be used in the three-dimensional vision system 110 include the Tyzx DeepSea™ and Point Grey Bumblebee™. These cameras may be monochrome or color, and may be sensitive to one or more specific bands of the electromagnetic spectrum including visible light, near-infrared, far infrared, and ultraviolet.

The three-dimensional vision system 110 may also be implemented using time-of-flight cameras. A time-of-flight camera detects distance information for each pixel of an image. The distance information for each pixel may include the distance from the camera to the object seen at that pixel. Time-of-flight cameras obtain this distance data by timing how long it takes an invisible light pulse to travel from a light source that may be located next to the camera to the object being imaged and then back to the camera. The light pulses may be rapidly repeated thereby allowing the time-of-flight camera to have a frame rate similar to that of a video camera. While a time-of-flight camera typically has a range of 1-2 meters at 30 frames per second, the range can be increased by lengthening the exposure time, which, in turn, lowers the frame rate. Manufacturers of time-of-flight cameras include Canesta Inc. of Sunnyvale, Calif., and 3DV Systems of Israel.

Embodiments of the three-dimensional vision system 110 may also be implemented using laser rangefinders, cameras paired with structured light projectors, laser scanners, laser line scanners, ultrasonic imagers, systems that derive three-dimensional data through the intersection of foreground images from several cameras, and/or any combination of the above. Multiple three-dimensional vision systems 110 may be simultaneously used whereby their three-dimensional data is merged together to create a unified data set describing objects in the interactive area.

While background illumination may be sufficient in some embodiments of the system 100, using an illuminator 120 may be necessary to improve the texture data to be processed through execution of a stereo algorithm by a processing device (e.g., in three-dimensional vision system 110 or at computing device 130). By lighting objects in the interactive area with a pattern of light, the illuminator 120 improves the amount of texture data that may be used by the stereo algorithm to match patches. The illuminator 120 may create a patterned and/or uneven light pattern to improve the detection of objects using a stereo algorithm. In some instances, the illuminator 120 may simply provide additional illumination of users 140 interacting with display 160.

Illuminator 120 may include concentrated light sources such as high power light-emitting diodes (LEDs), incandescent bulbs, halogen bulbs, metal halide bulbs, and arc lamps. More than one concentrated light source may be used simultaneously, either using the same scattering system as the first light source or a separate one. It should be noted that a substantially collimated light source, such as a lamp with a parabolic reflector or one or more narrow angle LEDs, may be used in place of a concentrated light source to achieve similar results.

A variety of patterns may be used by illuminator 120 such as a random dot pattern, a fractal noise pattern that provides noise on varying length scales, and a pattern comprising a set of parallel lines. The parallel lines may be randomly and varied with respect to their distancing to provide valuable texturing. A variety of methods may be utilized to generate such patterns. For example, the illuminator 120 may include one or more video projectors designed to project any image that is provided via a video input cable. The image may change over time to optimize the performance of the three-dimensional vision system 110. For example, the pattern may dim in an area where the three-dimensional vision system's 110 camera images are becoming saturated with light or become higher resolution in areas where the object is close to the camera. More than one video projector may be used to cover the whole interactive area.

The illuminator 120 may also use a structured light projector to cast out static or time-varying patterns. Examples of structured light projectors include the LCD-640™ and the MiniRot-H1™ from ABW. In another embodiment, the pattern may be generated by a slide projector including a light source, a transparent slide having an image, and a lens system or curved mirror system to project the image of the slide. More than one slide projector may be used to cover the whole of the interactive area. In another embodiment, the pattern is generated by a highly concentrated light source (a light that emanates from a small area). Alternately, a reflective or refractive system may be used.

The illuminator 120 may use an invisible or minimally visible light source, for example, a near-infrared light source, so as to avoid creating a visible pattern on the ground that may be noticed by users. Alternately, the illuminator 120 may have a light source that emits both visible and invisible light and may include a filter to reduce the visible light, leaving the invisible light. The illuminator 120 and cameras may be strobed through pulsing of the illuminator 120 during a synchronized camera exposure whereby the effect of ambient light is reduced or eliminated. The three-dimensional vision system 110 may contain optical filters that suppress light from wavelengths not emitted by the illuminator 120 thus allowing light from the illuminator 120 to be featured more prominently in images captured by the vision system 110.

Vision software may be executed at three-dimensional vision system 110 or at a computing device 130 coupled to the vision system 110. Execution of the vision software may improve the usefulness of captured image data. For example, where multiple three-dimensional cameras are used, vision software may aid in the calibration of the cameras such that the data from the cameras can be merged into the same coordinate space (i.e., the two cameras may cover a similar area from two different angles to provide coverage of the area from multiple angles). Such cameras may cover different areas where one camera may focus on close-up interaction while the other camera focuses on distant interaction. The quality and resolution of stereo processing may also be varied and effectuated through the execution of vision software. For example, the area closest to the display 160 may be processed at a higher resolution in order to resolve a user's 140 individual fingers 150 near the display 160 with more accuracy.

Several methods may be used to remove inaccuracies and noise in the three-dimensional data. For example, background methods may be used to mask out three-dimensional data from areas of the camera's field of view that are known to have not moved for a particular period of time. These background methods (also known as background subtraction methods) may be adaptive, allowing the background methods to adjust to changes in the background over time. These background methods may use luminance, chrominance, and/or distance data from the cameras in order to form the background and determine foreground. Once the foreground is determined, three-dimensional data gathered from outside the foreground region may be removed.

In a further embodiment, a color camera may be used to obtain chrominance data for the three-dimensional data of the user 140 and other objects in front of the display 160. This chrominance data may be used to acquire a color three-dimensional representation of the user 140, which allows their likeness to be recognized and tracked. The likeness of the recognized and tracked user 140 may subsequently be displayed.

Noise filtering may be applied to either a depth image, which is the distance from the camera to each pixel of the camera's image from the camera's point of view, or directly to the three-dimensional data gathered by the vision system 110. Smoothing and averaging techniques such as median filtering may be applied to the camera's depth image in order to reduce depth inaccuracies. Isolated points or small clusters of points may be removed from the three-dimensional data set if they do not correspond to a larger shape thus eliminating noise while leaving users intact.

The three-dimensional data may be analyzed in a variety of ways to produce high level information. For example, a user's fingertips, fingers, and hands may be detected (collectively represented as element 150 in FIG. 1). Methods for doing so include various shape recognition and object recognition algorithms. Objects may be segmented using any combination of two-dimensional and/or three-dimensional spatial, temporal, chrominance, or luminance data. Furthermore, objects may be segmented under various linear or non-linear transformations of the aforementioned domains. Examples of object detection algorithms include, but are not limited to deformable template matching, Hough transforms, and the aggregation of spatially contiguous pixels and/or voxels in an appropriately transformed space.

As another example, the three-dimensional points belonging to a user 140 may be clustered and labeled such that the cluster of points belonging to the user is identified. Various body parts, such as the head and arms (190) of a user 140 may be segmented as markers. Points may also be also clustered in three-dimensional space using unsupervised methods such as k-means or hierarchical clustering. The identified clusters may then enter a feature extraction and classification engine. Feature extraction and classification routines are not limited to three-dimensional spatial data but may also be applied to previous feature extractions or classifications in other data domains such as two-dimensional spatial, luminance, chrominance, or transformations thereof.

A skeletal model may also be mapped to the three-dimensional points belonging to a given user 140 via a variety of methods including but not limited to expectation maximization, gradient descent, particle filtering, and feature tracking. In addition, face recognition algorithms, such as Eigen face or fisher face may use data from the vision system such as two-dimensional and/or three-dimensional spatial, temporal, chrominance, and luminance data in order to identify users and their facial expressions. Facial recognition algorithms used may be image based or video based. This information may be used to identify users, especially in situations where they leave and return to the interactive area as well as change interactions with displayed content based on face, gender, identity, race, facial expression, or other characteristics.

Fingertips or other body parts may be tracked over time in order to recognize specific gestures such as pushing, grabbing, dragging, dropping, poking, and/or drawing of shapes using a finger, pinching, and other such movements.

The three-dimensional vision system 110 may be specially configured to detect specific objects other than the user 140. This detection may utilize object recognition algorithms executable to recognize specific aspects of the appearance or shape of the object, radio frequency identification (RFID) tags in the object read by an RFID reader (not shown) to provide identifying information, and/or a light source strobed in a particular pattern on an object to provide identifying information.

The user(s) 140 or other objects detected by the three-dimensional vision system 110 may be represented on the display 160. This representation 162 of the user 140 on the display 160 may be useful in allowing the user to interact with virtual, digital objects 164 (which may be referred to interchangeably as virtual or digital objects) shown on the display 160. Interaction may be facilitated by giving a visual indication of user position (162) relative to the digital objects 164.

This representation may include a digital shadow of the user(s) or other objects. For example, a two-dimensional shape that represents a projection of the three-dimensional data corresponding to the user's body onto a flat surface. The two-dimensional shape may approximate that of the user as well as with respect to size. Depending on a particular embodiment of the present invention, the representation of the user (or portions thereof) mayor may not interact with digital objects 164 on the display 160.

A digital outline of the user(s) or other objects may also be used to represent the user 162 on display 160 with respect to interacting with digital objects 164. The outline can be thought of as the edges of the digital shadow. This outline, similar to the digital shadow, may approximate the shape and size of the user. This shape may be colored, highlighted, rendered, or otherwise processed arbitrarily before display.

Various other images, icons, or two-dimensional or three-dimensional renderings representing the users' hands (150) or other body parts (190) or other objects may be rendered on display 160 for the purpose of interacting with digital objects 164. For example, the user's hand 150 may be represented on the display 160 as an approximation of the user's actual hand or as a 'hand-like' icon corresponding to the same.

Other interaction and representation methodologies include:
1. The shape of the user(s) rendered in the virtual space may be combined with markers on the user's hands 150 that are displayed when the hands are in a position to interact with on-screen objects. For example, the markers on the hands may only show up when the hands are pointed at the screen.
2. Points that represent the user(s) or other objects from the point cloud of three-dimensional data from the vision system 110 may be displayed as objects, which may be small and/or semitransparent.
3. Cursors representing the position of users' fingers (150) may be used. These cursors may be displayed or change appearance when the finger 150 of a user 140 is capable of a specific type of interaction in the virtual space.
4. Objects that move along with and/or are attached to various parts (190) of the users' bodies may be utilized. For example, a user 140 may have a helmet that moves and rotates with the movement and rotation of the user's head 190.
5. Digital avatars that match the body position of the user(s) 140 or other objects as they move. In one embodiment, the digital avatars are mapped to a skeletal model of the users' positions.
6. Any combination of the aforementioned representations.

In some embodiments, the representation may change appearance based on the users' allowed forms of interactions with on-screen objects. For example, a user 140 may be shown as a gray shadow and not be able to interact with objects until they come within a certain distance of the display 160, at which point their shadow changes color and they can begin to interact with on-screen objects.

Given the large number of potential features that can be extracted and gathered by the three-dimensional vision system 110 and the variety of virtual objects 164 that can be displayed on the screen, there are a large number of potential interactions between the users 140 and the virtual objects 164. Some examples of potential interactions include two-dimensional force-based interactions and influence image based interactions that can be extended to third dimension. Thus, three-dimensional data about the position of a user could be used to generate a three-dimensional influence image to affect the motion of a three-dimensional object. These interactions, in both two-and three-dimensions, allow the strength and direction of the force the user imparts on a virtual object 164 to be computed thereby giving the user control over how they impact the object's motion on the display 160.

Users 140 (or their displayed representation 162) may interact with digital objects 164 by intersecting with them in virtual space. This intersection may be calculated in three-dimensions or three-dimensional data from the user may be projected down to two-dimensions and calculated as a two-dimensional intersection.

Visual effects may be generated based on the three-dimensional data from the user. For example, a glow, warping, emission of particles, flame trail, or other visual effects may be generated using the three-dimensional position data or some portion thereof. Visual effects may be based on the position of specific body parts. For example, a user could create virtual fireballs by bringing their hands together. Users 140 may use specific gestures to pick up, drop, move, rotate, or otherwise modify virtual, digital objects 164 displayed on-screen.

The virtual space depicted on the display 160 may be shown in two-or three-dimensions. In either case, the system 100 merges information about the user 140 with information about the digital objects 164 and other images (e.g., user representation 162) displayed in the virtual space of the display 160. If the user 140 is depicted two dimensionally in the virtual space, then the three-dimensional data about the user's position may be projected onto a two-dimensional plane.

The mapping between the physical space 180 in front of the display 160 and the virtual space shown on the display 160 can be arbitrarily defined and can even change over time. The actual scene seen by the users 140 on the display 160 may vary based on the definitions of the physical space 180. Similarly, the virtual space (or just the user's representation 162) may be two-dimensional. In this case, the depth component of the user's virtual representation 162 may be ignored.

Mapping may operate in a manner similar to that of a mirror such that the motions of the user's representation 162 in the virtual space as seen by the user 140 are akin to a mirror image of the user's 140 actual motions. The mapping may be calibrated such that when the user 140 touches or brings a part of their body (150) near to the screen display 160, their virtual representation 162 touches or brings the same part of their body near to the same part of the screen 160. The mapping may also show the user's representation 162 appearing to recede from the surface of the screen 162 as the user 140 approaches the screen 160.

Figure 2:
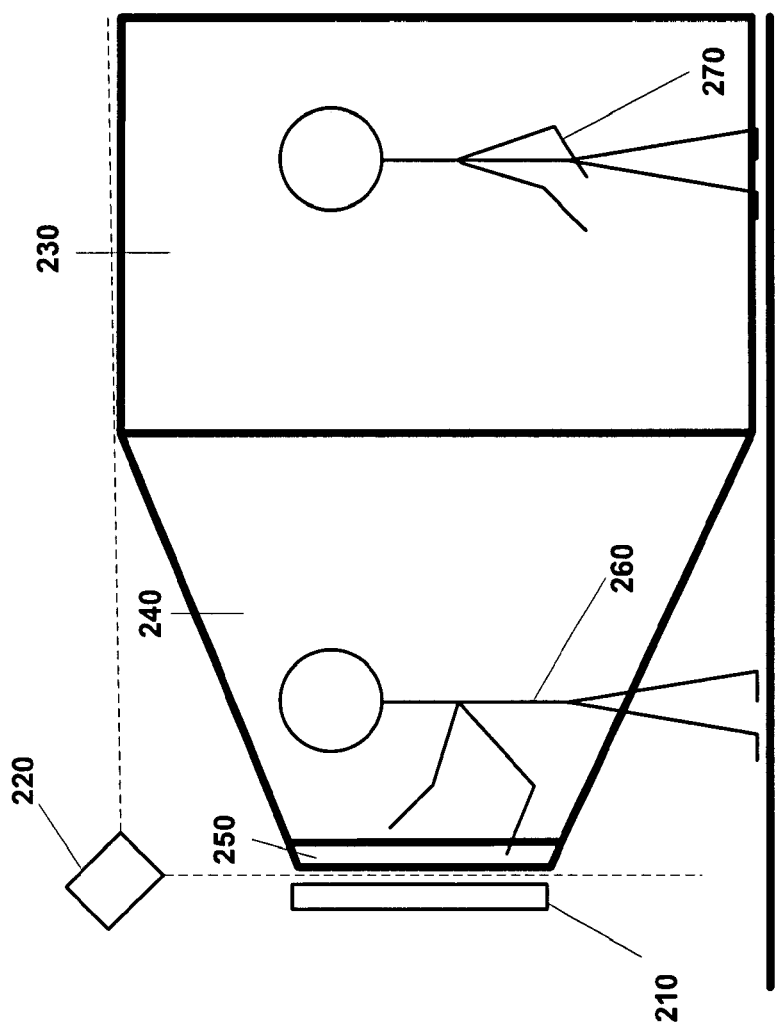
FIG. 2 illustrates an interactive display space including volumetric zones.

Multiple interactive areas may be created by partitioning the space in front of the vision system into multiple volumetric spaces and sorting the gathered data into these spaces. FIG. 2 illustrates an interactive display space including volumetric zones. Display space includes vision system 220 and display 210.

In FIG. 2, a "touch" space 250 primarily captures finger pointing interactions, a "primary users" space 240 captures the bodies of the people nearest the screen, and a "distant users" space 230 captures the bodies of the people who are more distant. The user representation on the screen may be different depending on what region in which they are present. For example, fingers in the "touch" space 250 may be represented by cursors, bodies 260 in the "primary users" space 240 may be represented by colored outlines, and bodies 270 in the "distant users" area 230 may be represented by gray outlines. The boundaries of the spaces may change. For example, if there is no one in the "primary users" space 250, the boundary of that space may expand to cover the "distant users" space 270.

Users who are beyond a certain distance from the screen or in a "distant users" space 270 may have their ability to interact with on-screen objects reduced or eliminated. This allows users close to the screen to interact with virtual objects without interference from more distant users. In some instances, a user may be too close to the display 210 and because of that proximity, likewise unable to interact with objects on the screen.

Various indicia may be represented on the display 210 indicating the present locale of a user and/or their ability to interact with objects on the display 210.

Providing indicia concerning the ability for a present interaction may be related to one or more reasons. For example, the display may be out of reach or a particular situation may call for large numbers of users interacting simultaneously and to discourage anyone user from coming up close and dominating the interaction. Other situations may include those where the display is behind a window and close-up interaction is impossible. In this case, a "too close" interaction space may be created.

In some embodiments, various effects may be displayed or audio emissions made in order to attract a user outside of the aforementioned volumetric areas into coming into the same. In one embodiment, the display shows a very large, highly visible flash or other reaction when no one is currently in the interactive space and a first user moves in to the interactive space. This feature is designed to draw a user's attention to the display when no one is currently interacting and the user passing into the interactive space may only see the display in their peripheral vision.

As addressed previously, the vision systems of the present invention may detect the hands and bodies of users. Hand and body detection may use the range, luminance, color, and/or other data. Hand and body detection methods may be applied to the raw color/luminance image, range image, three-dimensional point cloud, and/or other data. Hand and body detection methods may also be applied to any transformed or projected data based on the aforementioned data sets.

Bodies may be detected as spatially separated clusters of points in the three-dimensional cloud. Bodies may also be detected by projecting the point cloud onto the floor plane, and identifying regions of high density. Bodies may also be identified by looking for large connected components in the projected depth image after the removal of quickly varying regions of depth. Bodies may also be identified by performing template matching or skeletal matching on either the raw three-dimensional data or on a suitable projection. Preliminary identification may occur in one projection and then further refined in a separate projection. For instance, the vision system may use a floor plan view to pick out rough bounding boxes for users bodies. A frontal projection of the points within the bounding box may then be used to separate very close users.

Hands may be detected as isolated objects or as part of the user. In the former case, hands may be associated with a user. The position and motion of detected hands may be defined in relation to a user, the display, or some region in space either predefined or dynamically created in the course of interaction. Many possible coordinate systems may be used to specify this relationship, depending on the desired effect. For example, a polar coordinate system centered on the shoulder of the user from which the hand comes may be used. Hand detection methods may include identification through a skeletal fitting of the body; identification through template matching; identification through color based skin segmentation; identification as a body relative object; and identification based on connected component properties.

Once users' bodies have been identified, a bounding region such as a box, sphere or cylinder, may be centered at the user. Objects connected to the body, but outside of this region may become candidates for hands. These connected objects may be further segmented to identify the 'tip' or hand. Hands may be identified by taking the extreme regions of these objects such as the most distant point from the bounding box or some point on the body as could be defined, and any point that is within some threshold value below the maximum distance could be considered part of a hand. The hand may also be extracted from these regions through template matching. Hands may also be segmented from this region based on various features including, but not limited to curvature, distance from bounding box or body, and color properties. A skeleton model of an arm may also be fit to the region using expectation maximization.

Figure 3:
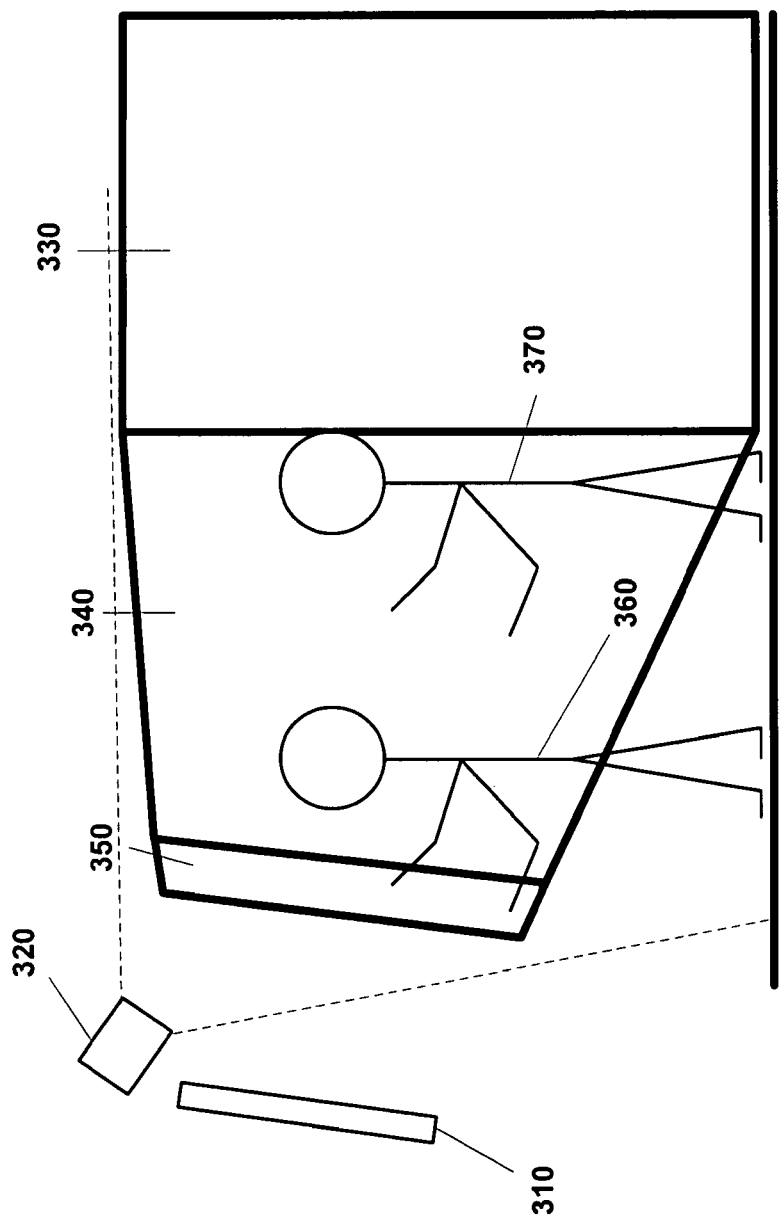
FIG. 3 illustrates an alternative embodiment of an interactive display space including volumetric zones.

FIG. 3 illustrates an alternative embodiment of an interactive display space including volumetric zones. In FIG. 3, interactive display 310 and camera/illuminator system 320 create an interactive space consisting of "too close" space 350, "hands" space 340, and "distant users" space 330. Users in "distant users" space 330 can only interact with their whole bodies and may see full-body user representations of themselves on the display. Users in "hands" space 340 can interact with their hands as well as their bodies and may see hand representations as well as full-body representations on the display.

Users who put their hand in "too close" space 350 may not be able to interact with either their hands or bodies and a visual on-screen representation such as a disappearing puff of smoke at the position of their hands or a fading image of their bodies may clue them in that they are getting too close to interact. For example, the user 360 may see the visual representation of their hands turn into a puff of smoke and may lose the ability to interact with on-screen objects using their hands. In contrast, user 370, who is in the "hands" space 340, has full ability to interact with on-screen objects using their hands and sees a different representation of their hands than user 360. The inner edge of the "too close" space may coincide with the boundary of the camera's field of view or the illuminator's field of illumination.

The display may display a representation of the user's body or specific body parts in order to provide visual feedback to the user as to their location within the virtual space shown on the display, and facilitate accurate interaction with the objects shown on the display. The display may also display a representation of a user's hand. Since many interactions between the user and the display may be via a user's hand, it may be advantageous to specifically highlight the hands of users. Hand representations may only be shown when the hand is sufficiently away from the body to convey some kind of gestural use. The representation used for the hand may depend on the position of the hand or how it is moving. It may also reflect whether the hand is capable of selecting or interacting with objects. It may be an anthropomorphic hand, a different type of object, or a combination of the two.

In one embodiment, the hand representation may only appear when the user, or their hand, is within a specific space in front of the display. Alternatively, the user's full body representation fades away or transforms when a user's hand representation begins to be displayed and returns when the user's hand representation is removed.

Figure 4:
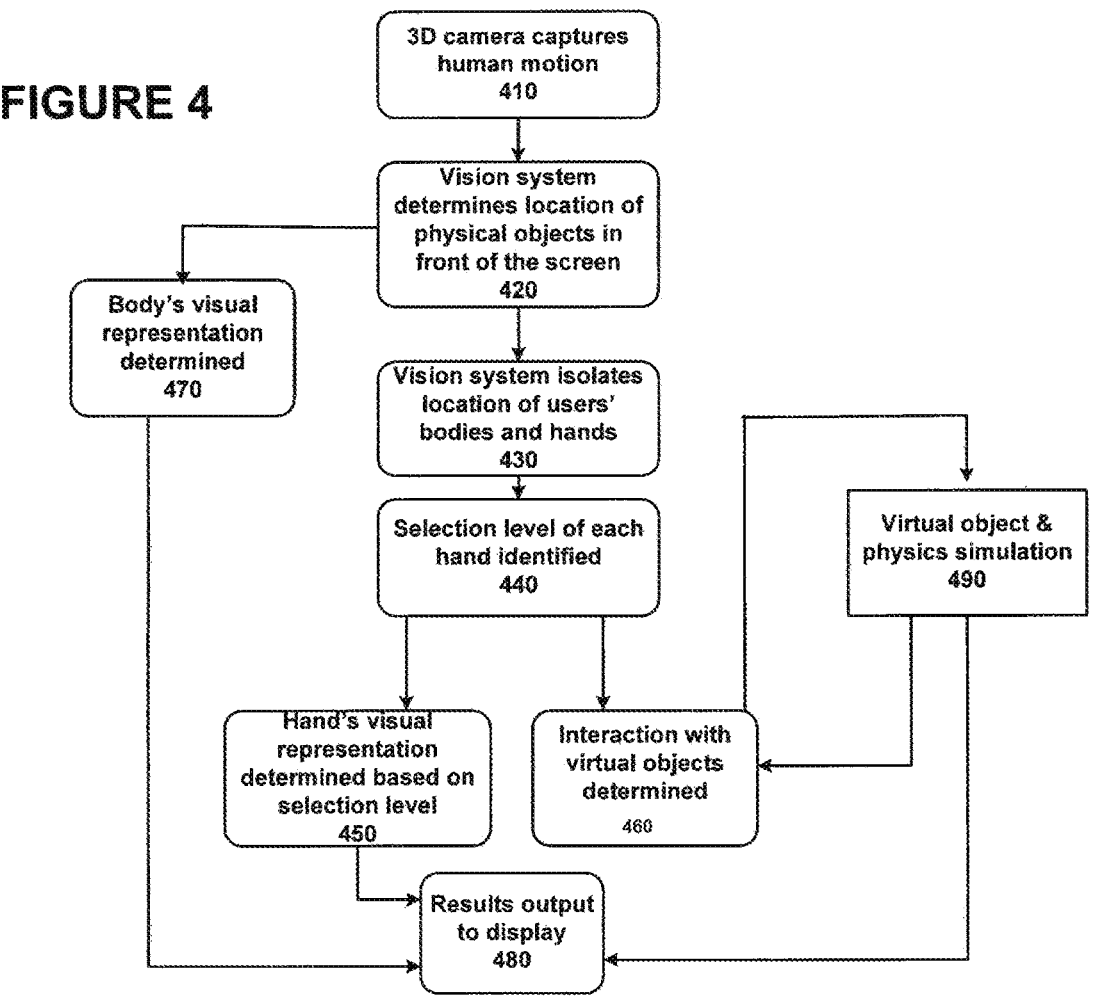
FIG. 4 illustrates an exemplary method for the processing of gesture-based interactions.

FIG. 4 illustrates an exemplary method for the processing of gesture-based interactions. In step 410, a camera capable of gathering real time three-dimensional data about its environment, such as a stereo or time-of-flight camera, captures the motion of one or more human users or other objects. In step 420, the data from the three-dimensional camera, which may take the form of a three-dimensional point cloud, is analyzed by a computer vision system, and potentially coordinate-transformed to determine the position of the data relative to the display and virtual objects shown on the display. In step 430, a computer vision system analyzes this data to determine the location of users' bodies and hands, and potentially other body parts. These body parts may be grouped by person, and their positions may be tracked over time to determine velocity, acceleration, and other characteristics.

In step 440, the degree to which each hand is making an action associated with selection of a virtual object, or some other interaction with a virtual object, is determined. In step 450, a visual representation of each hand, which may be different depending on its level of selection or other action, is determined. These visual representations are then rendered on the display in step 480, along with a representation of the users' bodies, which is created in step 470, and the virtual objects that the users have been interacting with, which are controlled by simulation 490. By rendering the representations on the display, the users can receive visual feedback about the position of their bodies and hands relative to virtual objects on the screen.

Separately, the selection level of each hand, which is determined by step 450, is processed in step 460 to determine whether the hands have interacted with any virtual objects from simulation 490. The user interaction process shown in FIG. 4 can repeatedly happen so quickly that it generates the impression of real-time interaction.

The process shown in FIG. 4 illustrates just one possible embodiment. Alternative embodiments may be implemented; for example, objects in simulation 490 may analyze the vision signals around them in order to determine if there is a nearby hand or selection behavior occurring thereby bypassing the need for steps 440 and 430.

Figure 5:
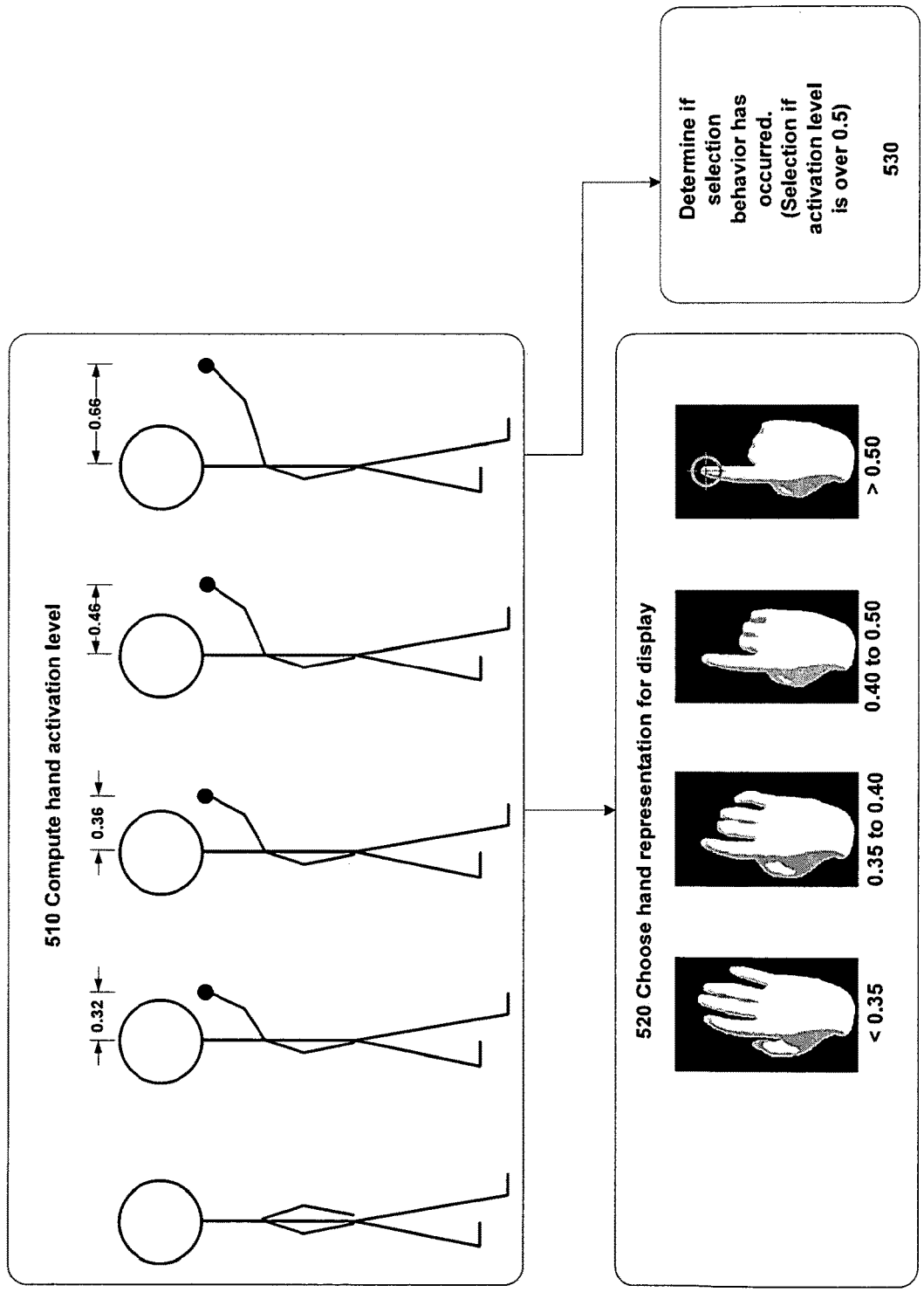
FIG. 5 illustrates hand/user representations vis-a-vis a selection level.

FIG. 5 illustrates hand/user representations vis-a-vis a selection level. In step 510, the degree to which the hand is selecting an object is determined. In the illustrated embodiment, a simple distance along the Z axis from the torso to the hand is determined. As the user extends their arm forward, this value increases. In step 520, a visual representation for the hand on the display is determined based on the distance value computed in step 510. The hand representation gradually closes from an open hand to a single pointing finger as the distance increases. This gives users feedback as to their level of partial selection—how far their hands are from reaching the threshold at which they gain the ability to select objects. When the hand has crossed the threshold into selection mode, where it has the ability to select objects, a crosshairs appears. If no hand is raised, no hand representation is shown. Separately, the distance computed in step 510 serves as an "activation level" in step 530, where the hand becomes able to select objects if the activation level exceeds, for example, 0.5. The example shown in FIG. 5 is merely illustrative as one possible embodiment. Numerous other selection methods can be used to compute an activation level.

In one embodiment, users' hands or bodies can interact with virtual objects via a two-dimensional or three-dimensional simulation of physical collisions. In one embodiment, the position of each hand in the virtual space shown on the display is used as input to the physics simulation that governs the behavior of the virtual objects. The hand may be modeled with a specific shape that can be either predefined, such as a sphere of specific radius, or derived from the two-dimensional or three-dimensional shape of the user's hand itself. In one embodiment, the hand's visual representation may serve as the model by the physics simulation.

The model of the hand in the physics simulation could be used to detect overlap and collisions with virtual objects shown on the display. The position of the hand over time can be used to derive velocity and acceleration, which would allow realistic collisions to be computed with virtual objects on the display. Collisions may be inelastic, partially elastic, or fully elastic, and may be computed using standard collision formulas known to those skilled in the art. Since the hand cannot physically be moved by the virtual object, the hand may be treated as if it has infinite mass for the purpose of calculating post-collision velocities.

Other body parts, such as arms, heads, or the entire body, may be input to the physics simulation in a similar fashion. The motion information about the hands or other body parts may be used to compute interactions other than collisions, such as fluid or ripple simulations, or particle emissions that are dependent on velocity or acceleration.

A virtual object attached to the hand or another body part may also be used to interact with virtual objects. For example, a virtual sword may be attached to the user's hand. Orientation of the object may be computed by analyzing the orientation of the user's hand, forearm, or arm, allowing the user to easily control the object's orientation. This object may be analyzed by the physics engine to determine interactions with other objects.

Figure 6:
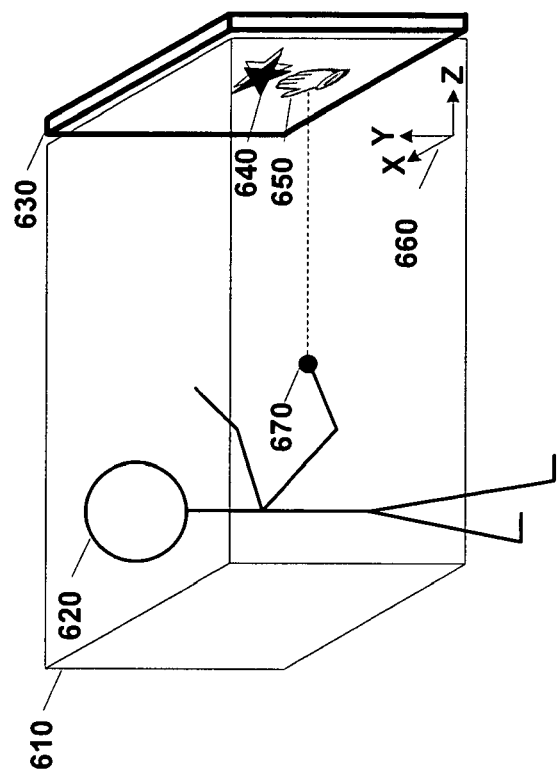
FIG. 6 illustrates how the physical position of a user can be mapped into a display virtual world of digital objects.

FIG. 6 illustrates how the physical position of a user can be mapped into a display virtual world of digital objects. In FIG. 6, user 620 is interacting in front of display 630. User 620 is within interactive space 610, which is the space within which their interactions can affect the display. Axes 660 define a coordinate system. The X and Y axes define horizontal and vertical position on the display 630, while the Z axis defines a perpendicular distance from the display 630. In this interactive space 610, user 620 is raising their hand 670 to interact with virtual object 640 displayed on the screen 630.

In one embodiment, overlap or proximity between hand 670 and virtual object 640 is computed by projecting the hand's position on the Z axis onto the (X, Y) plane of the display surface and then analyzing the relative (X, Y) positions of the hand 670 and virtual object 640. In addition, a representation 650 of hand 640 is displayed on display 630 at the position computed by projecting the hand's position along the Z axis. This representation provides user 620 with visual feedback as to the location of their hand 670 on the virtual world of display 630.

Figure 7:
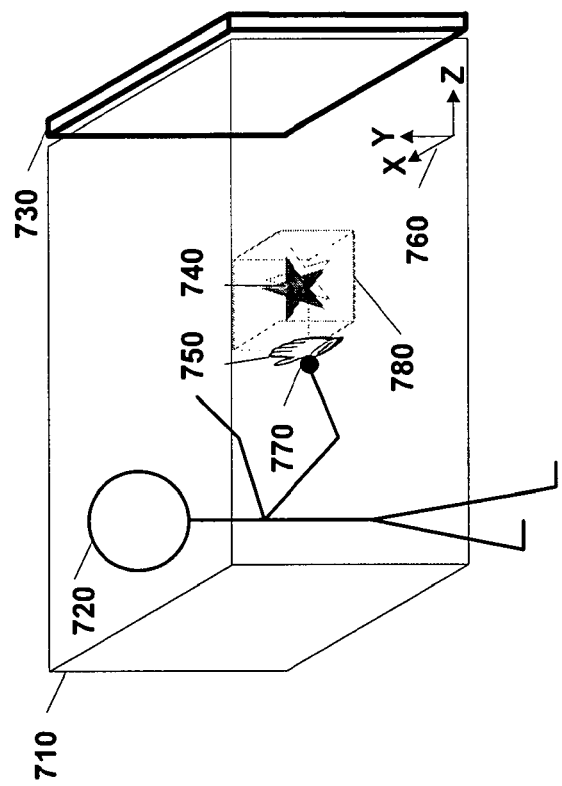
FIG. 7 illustrates an alternative embodiment of how the physical position of a user can be mapped into a display virtual world of digital objects.

FIG. 7 illustrates an alternative embodiment of how the physical position of a user can be mapped into a display virtual world of digital objects. In one embodiment, display 730 displays images on a two-dimensional surface and depth cues such as shadows or mist are used to convey depth. In another embodiment, display 730 is a display capable of producing an image that appears three-dimensional to user 720, giving the illusion that displayed images are at a particular distance in front of or behind the screen. Numerous three-dimensional display mechanisms exist and are commercially available, including, but not limited to, stereoscopic projections and lenticular video screens.

User 720 interacts in interactive space 710. When user 710 reaches their hand 770 out, a virtual representation 750 of their hand may be displayed by display 730. As the user's hand 770 enters within touch space 780 around virtual object 740 displayed by display 730, an interaction occurs. Coordinate axes 760 are illustrated for reference.

There are many potential methods that the system can use to select an on-screen object. It is important to minimize both false negatives and false positives thereby preventing the user from accidentally selecting objects that they do not want to select, and being unable to select objects they want to select. The information used to compute these user behaviors may use various inputs from the vision system, including but not limited to, current and past hand position and velocity, arm angle, current and past head position, and current and past torso position.

Selection can occur by holding a hand still over an object or region to be selected. The act of holding a hand still can be detected in several ways. For example, activation level may be tracked over time, with the object or region being selected if the activation level passes a threshold. Partial selection may be shown based on activation level. The hand position over time may contribute to the activation level. For example, the activation level may be decreased by an amount determined by a formula if the hand is moving quickly over the object or region or is outside the object or region, while the activation level may be increased by an amount determined by a formula if the hand is over the object or region and is moving slowly or stopped. The formula may take the velocity of the hand's motion into account such that the slower the hand moves, the faster the activation level will rise.

The average speed of the hand over a specified range of time below a specific value may also operate as a selection mechanism. Speed may be defined over a two-dimensional plane defining the interactive zone on the display, over the three-dimensional space in front of the display, or some other method; for example, the X and Y axes shown in FIGS. 6 and 7.

Other selection mechanisms include: the maximum speed of the hand over a specified range of time being below a specific value; the position of the hand in some two-dimensional (e.g., the X and Y axes shown in FIGS. 6 and 7) or three-dimensional coordinate system stays within a specified region for a specified period of time; the variance of the position of the hand in some two-dimensional (e.g., the X and Y axes shown in FIGS. 6 and 7) or three-dimensional coordinate system stays below a specific value for a specified period of time; the position data of the hand is averaged over a time interval, then the averaged position data is examined over a second time interval using any of the techniques described herein or another technique.

Selection can also occur by thrusting the hand toward the screen or virtual object in a poking motion. This act of poking can be detected in a variety of ways. For example: the distance of the hand from the screen decreases by more than a threshold amount within a specific period of time; the speed of the hand relative to the screen along the Z axis exceeds a particular value, and the hand is moving toward the screen; the time-averaged speed of the hand relative to the screen along the Z axis exceeds a particular value for a specified period of time, and the hand is moving towards the screen; any of the above examples, with the additional criterion that the X and Y speed (or time-averaged X and Y speed) of the hand remain below threshold values for a specified period of time. This prevents accidental selection when the users swing their hands; the velocity of the user is in a direction within a specified range of directions, and the speed exceeds a given amount. In one such embodiment, this range of directions consists of directions within a specified angle of a vector pointing directly along the Z axis toward the screen.

Selection may also occur based on the distance of the user's hand from the screen or an arbitrary three-dimensional region. Thus, when the user extends their hand into a "selection zone," the object can be selected. Selection can also occur based on the position of the user's hand relative to their body. This act can be detected in a variety of ways such as a user's hand is greater than a threshold distance from that user's head, torso, shoulder, or center of gravity; the ratio of the user's height to the distance from the user's hand to that user's head, torso, shoulder, center of gravity goes below a certain amount, which ensures that shorter people and taller people can make similar movements to select an object; distance may be defined in several ways; for example, it may consist of distance along the Z axis (toward the screen), or in three-dimensional space (X, Y, Z), or in a weighted coordinate system.

Selection can occur based on the user waving their hand rapidly over a specified location. Rapid waving can be detected by the average speed of the user's hand exceeds a threshold amount over a particular time interval but the position remains within a specific region. Selection can also occur based on the average speed of the user's hand exceeding a threshold amount over a particular time interval, but the variance of the position remains below a specific amount.

Selection may also occur based on the execution of a specific gesture.

Because different people may intuitively use different methods to select an object, it may be advantageous to allow multiple methods of selection. Thus, for example, a user may select an object if they hold their hand still over it for more than a specific period of time, or if they make a rapid poking motion at it.

In order to prevent accidental selection, multiple methods of selection may be required to be invoked simultaneously to trigger selection. For example, a user may need to hold their hand still for a specified period of time and keep their hand at least a minimum distance from their body.

Feedback may be used in the selection process to indicate the fact that a selection is taking place. In one embodiment, the on-screen representation for the user's hand changes when the hand is selecting an object. In another embodiment, the on-screen representation for the user's hand changes when the hand would be selecting an object based on its position or movement, even if no object is present in that area. In a still further embodiment, the on-screen object changes as a user selects, or has partially selected, the object.

The on-screen representation of the hand may alternatively begin to change as it starts to select an object. This provides visual feedback to the user about the nature of the selection process, and helps the user prevent accidental selections. In one embodiment, the change in user representation is chosen from a sequence of images based on a particular value of the selection detection algorithm. For example, if the selection detection algorithm is based on the distance of the hand from the user's body, the hand can gradually change appearance along an animation sequence, where the frame from the animation sequence is chosen using the distance value.

Multiple users can simultaneously interact with the display. The camera system is capable of sensing multiple bodies, and the vision system may be capable of disambiguating data from multiple users' bodies. This disambiguation enables the vision system to assign each hand to a specific user's body. As a result, different bodies and hands can have different user representations as well as different interactions with the virtual objects displayed on the display. In addition, the display can ignore specific users, or allow one user or a group of users to control a specific set of interactions.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the user interface may employ any of the desired functionality set forth hereinabove. Thus, the breadth and scope of a preferred embodiment should not be limited by any of the above-described exemplary embodiments.

For example, information from one or more display systems may be shared over a high speed data connection allowing for a variety of applications. For example, users of the display may be able to navigate and interact with an online virtual world such as Second Life, There, or World of Warcraft, and objects and avatars within that world using a gesture-based interface. In addition, the three-dimensional data of the position and movement of the users can be transmitted and displayed in the online virtual world thereby allowing other users of the online virtual world to see and interact with the users of the display. These other users may be using a variety of interfaces (e.g., a traditional keyboard-and-mouse interface) or another display to interact in the virtual world. The users may be near to or distant from each other.

The interface of the presently described embodiments may provide for a variety of potential uses. For example, with respect to sports, users may box, play tennis (with a virtual racket), throw virtual balls, or engage in other sports activity with a computer or human opponent shown on the screen. In the context of virtual world navigation, users may use natural body motions such as leaning to move around a virtual world, and use their hands to interact with objects in the virtual world. Virtual characters may be controlled through the aforementioned interface system where a digital character on the screen may talk, play, and otherwise interact with people in front of the display as they pass by it. This digital character may be computer controlled or may be controlled by a human being at a remote location.

Embodiments of the present invention allow for new implementations of advertising including interactive product demos and interactive brand experiences as well as multiuser workspaces where groups of users can move and manipulate data represented on the screen in a collaborative manner. Video games may also implement the aforementioned interface system such that users can play games and control their onscreen characters via gestures and natural body movements. Modeling and 'trying on' of clothes may also be utilized through this system where clothes are placed on the image of the user on the display thus allowing them to virtually try on clothes.

What is claimed is:

1. A method comprising:
 receiving information corresponding to a physical space from one or more cameras;
 mapping a position of a user in the physical space to a position in a virtual space based at least in part on the received information;
 presenting, via an output device, a representation of the user in the position within the virtual space;
 presenting, via the output device, a virtual object within the virtual space in a first state;
 detecting, via the one or more cameras, an interaction with the virtual object based on a movement of a first part of the user from a first position in the physical space to a second position in the physical space;
 determining a second state for presenting the virtual object based at least in part on the interaction and the first state;

presenting, via the output device, the representation of the user in the second position;

presenting, via the output device, the virtual object within the virtual space in the second state;

identifying a first zone within the physical space;

mapping the first zone to a portion of the virtual space; and in response to detection of at least a portion of the user approaching an inter-zone boundary between the first zone and a second zone from a first direction, adjusting a display characteristic of the virtual object to indicate that a change to portions of the user that are capable of interacting with the virtual object will occur if the user continues to move in the first direction.

2. The method of claim 1, wherein the information corresponding to the physical space includes a display distance indicating a distance of the user to the output device, the method comprising determining the second state for presenting the virtual object based at least in part on the interaction, the first state, and the display distance.

3. The method of claim 1, wherein the information corresponding to the physical space includes a display distance indicating a distance of the user to the output device, the method comprising:

determining that the display distance corresponds to a threshold distance; and detecting the interaction in response to said determining.

4. The method of claim 1, further comprising:

identifying a first zone within the physical space;

mapping the first zone to a portion of the virtual space; and in response to detection of at least a portion of the user approaching an inter-zone boundary between the first zone and a second zone from a first direction, adjusting a display characteristic of the virtual object to indicate that a change to portions of the user that are capable of interacting with the virtual object will occur if the user continues to move in the first direction.

5. The method of claim 4, wherein the representation of the user comprises a representation of a hand of the user.

6. The method of claim 1, wherein the information corresponding to the physical space includes a display distance indicating a distance of the user to the output device, the method comprising generating the representation of the user at least in part by: (a) projecting the second position along two dimensions of the virtual space and (b) projecting the distance of the user along a third dimension of the virtual space.

7. The method of claim 6 further comprising:

determining that the distance along the third dimension is less than a distance of the virtual object along the third dimension; and overlaying a portion of the virtual object with a portion of the representation of the user.

8. The method of claim 6 further comprising:

determining that the distance along the third dimension is greater than a distance of the virtual object along the third dimension; and overlaying a portion of the representation of the user with a portion of the virtual object.

9. A non-transitory computer readable storage having executable instructions stored thereon, the executable instructions configured to cause a computing system having one or more hardware processors to perform operations comprising:

receiving information corresponding to a physical space from one or more cameras;

mapping a position of a user in the physical space to a position in a virtual space based at least in part on the received information;

presenting, via an output device, a representation of the user in the position within the virtual space;

presenting, via the output device, a virtual object within the virtual space in a first state;

detecting, via the one or more cameras, an interaction with the virtual object based on a movement of a first part of the user from a first position in the physical space to a second position in the physical space;

determining a second state for presenting the virtual object based at least in part on the interaction and the first state;

presenting, via the output device, the representation of the user in the second position; and presenting, via the output device, the virtual object within the virtual space in the second state;

identifying a first zone within the physical space;

mapping the first zone to a portion of the virtual space; and in response to detection of at least a portion of the user approaching an inter-zone boundary between the first zone and a second zone from a first direction, adjusting a display characteristic of the virtual object to indicate that a change to portions of the user that are capable of interacting with the virtual object will occur if the user continues to move in the first direction.

10. The non-transitory computer readable storage of claim 9, wherein the information corresponding to the physical space includes a display distance indicating a distance of the user to the output device, and wherein the computer system further performs operations comprising determining the second state for presenting the virtual object based at least in part on the interaction, the first state, and the display distance.

11. The non-transitory computer readable storage of claim 9, wherein the information corresponding to the physical space includes a display distance indicating a distance of the user to the output device, and wherein the computer system further performs operations comprising: determining that the display distance corresponds to a threshold distance; and further comprising detecting the interaction in response to said determining.

12. The non-transitory computer readable storage of claim 9, wherein the representation of the user comprises a representation of a hand of the user.

13. The non-transitory computer readable storage of claim 9, wherein the information corresponding to the physical space includes a display distance indicating a distance of the user to the output device, and wherein the computer system further performs operations comprising generating the representation of the user at least in part by: (a) projecting the second position along two dimensions of the virtual space and (b) projecting the distance of the user along a third dimension of the virtual space.

14. The non-transitory computer readable storage of claim 13, wherein the computer system further performs operations comprising:

determining that the distance along the third dimension is greater than a distance of the virtual object along the third dimension; and overlaying a portion of the representation of the user with a portion of the virtual object.

15. A computing system comprising:
a camera; and
one or more hardware processors configured to execute instructions to cause the computing system to:
receive information corresponding to a physical space from the camera;
map a position of a user in the physical space to a position in a virtual space based at least in part on the received information;
present, via an output device, a representation of the user in the position within the virtual space;
present, via the output device, a virtual object within the virtual space in a first state;
detect, via the camera, an interaction with the virtual object based on a movement of a first part of the user from a first position in the physical space to a second position in the physical space;
determine a second state for presenting the virtual object based at least in part on the interaction and the first state;
present, via the output device, the representation of the user in the second position; and
present, via the output device, the virtual object within the virtual space in the second state;
identify a first zone within the physical space;
map the first zone to a portion of the virtual space; and
in response to detection of the at least a first portion of the user approaching an inter-zone boundary between the first zone and a second zone from a first direction, adjust a display characteristic of the virtual object to indicate that a change to portions of the user that are capable of interacting with the virtual object will occur if the user continues to move in the first direction.

16. The computing system of claim 15,
wherein the information corresponding to the physical space includes a display distance indicating a distance of the user to the output device, and
wherein the instructions further cause the computer system to determine the second state for presenting the virtual object based at least in part on the interaction, the first state, and the display distance.

17. The computing system of claim 15,
wherein the information corresponding to the physical space includes a display distance indicating a distance of the user to the output device, and
wherein the instructions further cause the computer system to:
determine that the display distance corresponds to a threshold distance; and
in response to determining that the display distance corresponds to the threshold distance, detect the interaction.

18. The computing system of claim 15, wherein the representation of the user comprises a representation of a hand of the user.

19. The computing system of claim 15,
wherein the information corresponding to the physical space includes a display distance indicating a distance of the user to the output device, and
wherein the instructions further cause the computer system to generate the representation of the user at least in part by: (a) projecting the second position along two dimensions of the virtual space and (b) projecting the distance of the user along a third dimension of the virtual space.

20. The computing system of claim 19, wherein the instructions further cause the computer system to:
determine that the distance along the third dimension is less than a distance of the virtual object along the third dimension; and
overlay a portion of the virtual object with a portion of the representation of the user.

* * * * *

UNITED STATES PATENT AND TRADEMARK OFFICE
CERTIFICATE OF CORRECTION

PATENT NO. : 10,564,731 B2
APPLICATION NO. : 15/803517
DATED : February 18, 2020
INVENTOR(S) : Matthew Bell et al.

Page 1 of 1

It is certified that error appears in the above-identified patent and that said Letters Patent is hereby corrected as shown below:

In the Claims

In Column 18, Line 16, Claim 9, after "position;" delete "and".

In Column 19, Line 26, Claim 15, after "position;" delete "and".

Signed and Sealed this
Thirty-first Day of March, 2020

Andrei Iancu
*Director of the United States Patent and Trademark Office*